United States Patent
Nagata et al.

(10) Patent No.: US 12,360,805 B2
(45) Date of Patent: Jul. 15, 2025

(54) VECTORIZED SCALAR PROCESSOR FOR EXECUTING SCALAR INSTRUCTIONS IN MULTI-THREADED COMPUTING

(71) Applicant: AzurEngine Technologies Zhuhai Inc., Zhuhai (CN)

(72) Inventors: Toshio Nagata, Lake Elsinore, CA (US); Yuan Li, San Diego, CA (US); Jianbin Zhu, San Diego, CA (US)

(73) Assignee: AzurEngine Technologies Zhuhai Inc., Zhuhai (CN)

( * ) Notice: Subject to any disclaimer, the term of this patent is extended or adjusted under 35 U.S.C. 154(b) by 6 days.

(21) Appl. No.: 18/220,154

(22) Filed: Jul. 10, 2023

(65) Prior Publication Data

US 2025/0021376 A1     Jan. 16, 2025

(51) Int. Cl.
  *G06F 9/44*    (2018.01)
  *G06F 9/48*    (2006.01)
  *G06F 9/54*    (2006.01)
  *G06F 15/80*   (2006.01)

(52) U.S. Cl.
  CPC ............ *G06F 9/4881* (2013.01); *G06F 9/542* (2013.01); *G06F 15/8092* (2013.01)

(58) Field of Classification Search
  CPC ..... G06F 9/4881; G06F 9/542; G06F 15/8092
  See application file for complete search history.

(56) References Cited

U.S. PATENT DOCUMENTS

| | | | | |
|---|---|---|---|---|
| 9,292,287 B2 * | 3/2016 | Lee | ............................ | G06F 9/38 |
| 10,565,017 B2 * | 2/2020 | Suh | ........................ | G06F 9/3888 |
| 11,144,348 B2 * | 10/2021 | Kutschbach | .......... | G06F 9/5027 |
| 11,507,475 B2 * | 11/2022 | Boettcher | ........... | G06F 11/0751 |
| 2008/0022072 A1 * | 1/2008 | Jung | ...................... | G06F 9/3867 |
| | | | | 712/209 |
| 2014/0137123 A1 * | 5/2014 | Hartmann | .............. | G06F 1/3287 |
| | | | | 718/102 |
| 2022/0114234 A1 * | 4/2022 | George | .................. | G06F 7/5443 |
| 2023/0315479 A1 * | 10/2023 | Thuerck | ................ | G06F 9/3887 |
| | | | | 712/7 |

* cited by examiner

*Primary Examiner* — Cheng Yuan Tseng
(74) *Attorney, Agent, or Firm* — IPro, PLLC

(57) ABSTRACT

Processors, systems and methods are provided for thread level parallel processing. A processor may include a sequencer and a plurality of columns of vector processing units coupled to the sequencer. The sequencer may include a scalar instruction decoder, a vector instruction decoder, and a plurality of scalar processors configured to concurrently execute one or more scalar instructions decoded by the scalar instruction decoder to generate one or more vectors of parameters. The vector instruction decoder may be configured to decode one or more vector instructions to generate a set of configurations with the one or more vectors of parameters embedded as one or more vectors of immediate values and send the configurations to a target column. Each column of vector processing units may be configured to repeatedly execute the vector operations in the configurations using one or more respective elements of one or more vectors of immediate values per repetition.

22 Claims, 12 Drawing Sheets

VECTORIZED SCALAR PROCESSOR FOR EXECUTING SCALAR INSTRUCTIONS IN MULTI-THREADED COMPUTING

TECHNICAL FIELD

The disclosure herein relates to computer architecture, particularly relates to a multi-threaded computer architecture that executes scalar and vector instructions by different hardware components in a Single Instruction Multiple Threads (SIMT) computing system.

BACKGROUND

Graphics processing unit (GPU) architecture has provided a way to execute parallel threads in a Single Instruction Multiple Threads (SIMT) fashion. A SIMT processor such as a GPU has many cores configured to execute multiple threads simultaneously and is especially suitable for massive parallel computing applications. To take advantage of multiple cores for parallel execution, computer programs normally have to be tailored for the multi-core architecture by invoking functions of an Application Programming Interface (API) specifically designed to work on multiple cores. More recently, general-purpose computing on GPUs (GPGPU), which makes use of a GPU to perform computation in applications traditionally handled by the central processing unit (CPU), becomes more practical and popular. However, a SIMT processor is very inefficient for scalar operations because a scalar instruction needs only one core to execute and all other cores will be idle while the single core is performing the scalar operation. But general-purpose computing always has scalar operations in addition to computation tasks that need parallel processing. In some situations, scalar operations may become a bottleneck and affect performance.

By performing scalar operations and parallel data processing in separate hardware units of a processor, the processor can take advantage of large latency in processing massive parallel data to hide latency in instruction fetching and scalar operations. However, in some situations where the amount of parallel data is not sufficient, parallel data processing unit can be idle during instruction fetching and scalar operations. Therefore, there is a need in the art for a processor to handle multi-threaded computing efficiently.

SUMMARY

The present disclosure describes apparatus, methods and systems for efficiently performing scalar operations and massive parallel data processing in one processor. A processor according to various embodiments of the present disclosure may be designed to take advantage of massive thread level parallelism using programable processing element array and let the scalar operations handled separately. As used herein, a scalar operation may refer to execution of a scalar instruction and a vector operation may refer to execution of a vector instruction.

In an exemplary embodiment, a processor may comprise a sequencer and a plurality of columns of vector processing units coupled to the sequencer. The sequencer may include: a scalar instruction decoder, a vector instruction decoder, and a plurality of scalar processors configured to concurrently execute each of one or more scalar instructions decoded by the scalar instruction decoder to generate one or more vectors of parameters. The vector instruction decoder may be configured to decode one or more vector instructions to generate a set of configurations with the one or more vectors of parameters embedded therein as one or more vectors of immediate values and send the set of configurations to a target column of the plurality of columns of vector processing units, and vector processing units in the target column may be configured to repeat vector operations specified in the set of configurations using one or more respective elements of one or more vectors of immediate values per repetition.

In another embodiment, a processor, comprising: a sequencer and a plurality of columns of vector processing units coupled to the sequencer. The sequencer may be configured to: decode one or more scalar instructions, execute the one or more scalar instructions to generate one or more vectors of parameters, and decode one or more vector instructions to generate a set of configurations with the one or more vectors of parameters embedded therein as one or more vectors of immediate values. The sequencer may be configured to send the set of configurations to a target column of the plurality of columns of vector processing units, and vector processing units in the target column may be configured to repeat vector operations specified in the set of configurations using one or more respective elements of the one or more vectors of immediate values per repetition.

In yet another exemplary embodiment, a method may comprise reading a vector size representing a number of thread blocks that a kernel program processes in sequence and thread block index information of each of the thread blocks when the kernel program is initiated in a sequencer; fetching a sequence of instructions of the kernel program including one or more scalar instructions and one or more vector instructions in the sequencer; determining whether each instruction of the sequence of instructions is scalar or vector using a controller of the sequencer; decoding one or more scalar instructions using a scalar instruction decoder of the sequencer; executing, concurrently using a plurality of scalar processors of the sequencer, each of the one or more scalar instructions decoded by the scalar instruction decoder to generate one or more vectors of parameters, each element of each vector of one or more vectors of parameters is for a respective thread block of the thread blocks for the kernel program; decoding, using a vector instruction decoder of the sequencer, one or more vector instructions to generate a set of configurations with the one or more vectors of parameters embedded therein as one or more vectors of immediate values; delivering the set of configurations to a target column of a plurality of columns of vector processing units coupled to the sequencer; and repeatedly execute, at vector processing units of the target column, vector operations specified in the set of configurations using one or more respective elements of the one or more vectors of immediate values per repetition.

DETAILED DESCRIPTION

Figure 1:
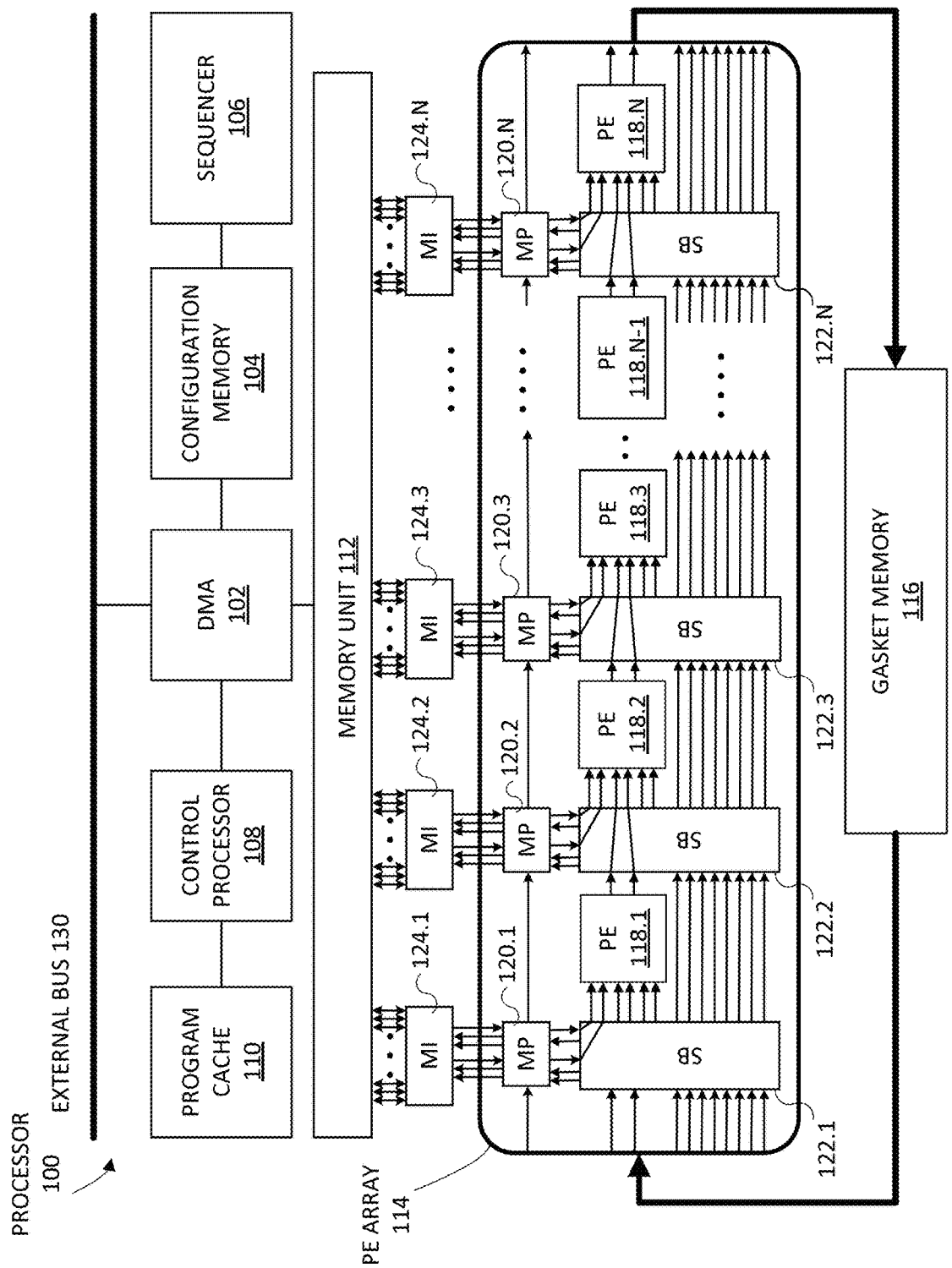
FIG. 1 schematically shows a processor in accordance with an embodiment of the present disclosure.

Reference will now be made in detail to the embodiments of the present teaching, examples of which are illustrated in the accompanying drawings. Like elements in the various figures are denoted by like reference numerals for consistency. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

FIG. 1 schematically shows a processor 100 according to an embodiment of the present disclosure. The processor 100 may comprise a direct memory access (DMA) module 102, a configuration memory 104, a sequencer 106, a control processor 108, a program cache 110, a memory unit 112, a plurality of memory interfaces 124.1-124.N, a PE array 114 and a gasket memory 116. The DMA module 102 may be coupled to an external bus 130 and may be controlled by the control processor 108. The DMA module 102 may be responsible to move executable instructions and non-executable data in and out from the external bus 130. The program cache 110 may store instructions and data to be used by the control processor 108 to control the operation of the DMA module 102. In one embodiment, the instructions and data stored in the program cache 110 may be used by the control processor 108 to handle kernel programs.

In some embodiments, the processor 100 may be configured for massive thread level parallel processing. For example, one processing element (PE) in the PE array 114 may comprise a vector Arithmetic Logic Unit (ALU) with a vector size more than one and each ALU of a vector ALU may be configured to perform same operation but on different data (e.g., each thread may operate on its own data). That is, in these embodiments with multiple ALUs, each PE may be configured to operate in a Single Instruction Multiple Threads (SIMT) fashion. In one embodiment, a PE with multiple vector data inputs may generate one vector data output. In some embodiments, a thread may also be referred to as a stream.

To provide data for multiple threads to be executed concurrently, in some embodiments, some relevant electronic connections between components of the processor 100 may be in vectors. For example, a vector address connection of K×G bits may have K number of G-bit addresses and a vector data connection of K×M bits may have K number of M-bit data. It should also be noted that although not shown in any of the figures, data or address connections between different components may be accompanied by one or more signal lines. For example, a busy signal line may exist between a first component and a second component, and may be used by the first component to send a busy signal to the second component indicating that the first component is not ready to accept valid data or address signals. Moreover, a valid signal line may also exist between the first and second components, and may be used by the second component to send a valid signal to the first component indicating that valid data or address signals have been put on the connection wires.

The configuration memory 104 may store data path programs including arithmetic and logical instructions, and load and store instructions for data path components. In one embodiment, the data path programs stored in the configuration memory 104 may be sequence(s) of compiled instructions. For example, a data path program may include instructions to be executed by the PE array 114, which may specify what kind of operations PEs may perform, and how data path components may hold or transmit data.

The sequencer 106 may decode the instructions stored in the configuration memory 104. The instructions may include scalar instructions and vector instructions. For a scalar instruction, the sequencer 106 may decode the scalar instruction and perform the scalar operation coded by the scalar instruction. For a vector instruction, the sequencer 106 may decode the vector instruction and deliver the decoded vector instruction to various components of the PE array 114 (e.g., components of the PE array 114 that will be involved in arithmetic and logical operations, and data movement operations), such that the vector operations coded by the vector instruction may be performed by the components of the PE array 114. These components of the PE array 114 may also be referred to as vector processing units. As used herein, a scalar operation may refer to execution of a scalar instruction and a vector operation may refer to execution of a vector instruction.

The decoded vector instruction may be delivered to various components in a package, which may be referred to as a configuration package or simply a configuration. In addition to the decoded instruction, a configuration package for one component may include some other parameters (e.g., the number of warps specifying how many times an instruction is to be repeatedly executed and how many times data passes through a data switching unit in one configuration setting, and immediate values passed from the sequencer to the components). In one embodiment, a physical data path configuration may be referred to as a physical data path program, which may comprise individual configurations for various components included in a physical data path.

Although not shown, there may be one or more configuration bus connecting the sequencer 106 to the components of the PE array 114 for individual configurations to be delivered to these components via the bus. For example, there may be a respective configuration bus for delivering the configurations for the memory ports, switch boxes and PEs. In some embodiments, the configuration for the memory ports may include data preparation instructions, such as but not limited to, LOAD/STORE instructions (and parameters, such as addresses, for the instructions), and the configuration for the PEs may include instructions to be executed by the ALUs in the PEs, such as but not limited to, data crunching instructions like addition or subtraction.

The memory unit 112 may be a data staging area to store data received from the external bus 130 and also execution result data generated by the PE array 114 (before these results may be transmitted away via the external bus 130). In some embodiments, the memory unit 112 may be an in-processor cache for a large memory system external of the processor 100.

The PE array 114 may comprise a plurality of memory ports (MPs) 120.1-120.N, a plurality of switch boxes (SBs) 122.1-122.N, and a plurality of processing elements (PEs) 118.1-118.N. These components may form N columns of programable hardware units or programable hardware components. For example, the MP 120.1, SB 122.1, and PE 118.1 may form the first column of the PE array 114, and the MP 120.N, SB 122.N, and PE 118.N may form the Nth column of the PE array 114. Each column of programable hardware units may also be referred to as a column of vector processing units or simply a column in an embodiment in which each of these hardware units is configured for vector processing. In the example shown in FIG. 1, the PE array 114 may comprise one row of processing elements 118.1-118.N, which may include N PEs with N being an integer number. In the embodiments described herein, the number N may be 32. But this is an example and it may be another integer number in other embodiments, such as, but not limited to, 16, 64, etc. Although these example numbers given may be power of 2, the number of PEs in one row need not be a power of 2 in one embodiment.

The plurality of MPs 120.1-120.N may be programmable hardware units controlling data flow between the PE array 114 and the memory unit 112. As shown in FIG. 1, the plurality of MPs 120.1-120.N may be coupled to the memory unit 112 via the plurality of memory interfaces (MIs) 124.1-124.N. Each MP 120.1-120.N may be coupled to the memory unit 112 via a respective MI 124.1-124.N to read from and write to the memory unit 112. Thus, the MI 124.1 may be the gateway to the memory unit 112 for the first column of PE array 114, and so on until the MI 124.N may be the gateway to the memory unit 112 for the N-th column of PE array 114. Each MP 120.1-120.N may also be coupled to a SB in a respective column to transmit data to and from each column. For example, MP 120.1 may be coupled to SB 122.1, MP 120.2 may be coupled to SB 122.2, and so on. In some embodiments, the memory unit 112 and the MIs 124.1-124.N may be collectively referred to as a multi-port memory unit. Moreover, in at least one embodiment, the memory unit 112, the MIs 124.1-124.N and MPs 120.1-120.N may support two memory accessing modes: a private memory access mode and a shared memory access mode, which may also be referred to as the private memory access method (or simply private memory access) and shared memory access method (or simply shared memory access). It should be noted that while MIs 124.1-124.N are shown as separate entities in FIG. 1, in some embodiments, they may be implemented as part of respective MPs 120.1-120.N, or in some other embodiments, as part of the memory unit 112.

With the exception of MP 120.1 and MP 120.N, all MPs may be coupled to two adjacent MPs such that each MP may be configured to receive addresses from a preceding MP and/or transmit addresses to a succeeding MP. The electronic coupling between MPs may provide a one-way flow of addresses (e.g., if one configuration specifies that addresses may flow from one MP to a next MP). For example, as shown in FIG. 1, MP 120.1 may be coupled to MP 120.2 for one-way flow of addresses, MP 120.2 may be coupled to MP 120.3 for one-way flow of addresses. The last MP 120.N may be an exception and coupled to the gasket memory 116, which may provide a temporary storage for addresses. The first MP 120.1 may be another exception in that it may receive one-way flow of addresses from the gasket memory 116. In some embodiments, the MPs 120.1-120.N may form an address routing bus along a PE row direction. That is, addresses may be routed between MPs in a direction that is parallel to the direction in which data may be routed between PEs and SBs. In at least one embodiment, the addresses transmitted between the MPs may be memory addresses updated by a MP. For example, a MP may perform some operation on the memory addresses (e.g., updating memory addresses) and pass the updated memory addresses to the next MP in the succeeding column.

The gasket memory 116 may be used as a data buffer, for example, first-in-first-out (FIFO), to collect addresses and data from the PE array (e.g., from MP 120.N, PE 118.N and/or SB 122.N) and feed them back to the PE array (e.g., to MP 120.1, and/or SB 122.1) when the first column of the PE array (e.g., MP 120.1, SB 122.1, and PE 118.1) is reconfigured by new configurations.

In some embodiments, the PEs, SBs, and MPs may be statically configured while processing a thread block. For example, each of PEs, SBs, and MPs may be programmed with instructions specified in respective configurations to perform one stage of a pipeline. No instructions may be changed while data in the thread block are passing through the pipeline stage. The address computation instructions and memory access instructions such as LOAD and STORE may be mapped to MPs (e.g., packaged in configurations sent to respective MPs), the data switching instructions may be mapped to SBs (e.g., packaged in configurations sent to respective SBs), and other instructions may be mapped to PEs (e.g., packaged in configurations sent to respective PEs).

As illustrated in FIG. 1, each of the SB 122.1-122.N may be coupled to two adjacent SB (e.g., a preceding SB and a succeeding SB), with the exception of SB 122.1 and SB 122.N. SB 122.1 may be coupled to the MP 120.1, the gasket memory 116, PE 118.1 and the SB 122.2. And SB 122.N may be coupled to the MP 120.N, the gasket memory 116, PE 118.N and the SB 122.N−1. In some embodiments, the SBs 122.1-122.N may form data routing buses along a PE row direction. That is, data may be routed between SBs in a direction that is parallel to the direction in which data may be routed between PEs. In one embodiment, one or more SBs may be used to route data to bypass one or more PEs.

The SBs 122.1-122.N may be configured to provide data switching for data to be routed between neighboring PEs, from a PE to a MP, from a PE to the data routing buses, from a MP to a PE, from a MP to the data routing buses, from the data routing buses to a PE, and from the data routing buses to a MP. For example, the switch box 122.1 may be configured to provide data switching for data to be delivered to the processing element 118.1 from the gasket memory 116, the MP 120.1 or both. Moreover, the switch box 122.1 may be configured to route data from the gasket memory 116 to the MP 120.1. As another example, the switch box 122.2 may be configured to provide data switching for data to be delivered to the processing element 118.2 from the processing element 118.1, the MP 120.2, and/or the SB 122.1. Moreover, the switch box 122.2 may be configured to route data from the processing element 118.1 to the MP 120.2 or SB 122.3, from the SB 122.1 to the MP 120.2 or SB 122.3. In yet another example, the switch box 122.N may be configured to provide data switching for data to be delivered to the processing element 118.N from the PE 118.N−1, the MP 120.N, the SB 122.N−1 or any combination of the three sources. Moreover, the switch box 122.N may be configured to route data between PE 118.N−1, MP 120.N, SB 122.N−1 and the gasket memory 116. A SB may also be referred to as a data switching unit.

In some embodiments, output ports of vector processing units (e.g., each MP, each SB, and each PE) may be vector address or vector data ports. Address or data buffers at the output ports may be treated as vector registers. For example, a data buffer at one output port of the PE 118.1 coupled to the SB122.2 may be treated as a vector register for holding a vector of input values to the SB122.2. A data buffer at another output port of the PE 118.1 coupled to the SB122.2 may be treated as another vector register to hold another vector of input values to the SB 122.2. Also, data buffers at output ports of the SB 122.1 coupled to the SB 122.2 may be treated as vector registers for holding vectors of data values to be passed to the SB 122.2.

In one embodiment, data or address buffers at output ports of vector processing units may be mapped to vector registers labeled as VA, VB, IA, IB, IC, ID, IE, IF, IG, IH and DVA. VA and VB may be vector registers for output data buffers of a PE. IA, IB, IC, ID, IE, IF, IG, and IH may be vector registers for output data buffers of a SB at output ports coupled to input ports of the succeeding SB or the gasket memory. DVA may be a vector register for an output address buffer of a MP. Also, virtual vector registers MA and MB may be mapped to data connections from a MP to a SB so that the SB may route data read from the memory unit 112 to input ports of a PE. MA and MB may represent data obtained by the shared memory access and by the private memory access, respectively. The width of DVA may be K×G bits. The widths of other vector registers may be K×M bits. To support 2×M-bit operations, 2 vector registers may be concatenated into a register pair and labeled as VAB, IAB, ICD, IEF, IGH, and MAB. For example, IAB may indicate a concatenated vector register pair (IB, IA) with IB being the higher M bits and IA being the lower M bits. Here (,) denotes component by component concatenation of M-bit data from 2 vector registers.

An exemplary data path may be illustrated by the exemplary internal connections of the SBs 122.1 to 122.N. For example, as shown in FIG. 1, SB 122.1 may show that two inputs of PE 118.1 may be coupled to two outputs from MP 120.1, SB 122.2 may show that two inputs of PE 118.2 may be coupled to two outputs from MP 120.2 and another two inputs of PE 118.2 may be coupled to two outputs from PE 118.1, SB 122.3 may show that two inputs of PE 118.3 may be coupled to two outputs from MP 120.3 and another two inputs of PE 118.3 may be coupled to two outputs from PE 118.2, and so forth, until SB 122.N may show that two inputs of PE 118.N may be coupled to two outputs from MP 120.N and another two inputs of PE 118.N may be coupled to two outputs from PE 118.N−1.

To simplify wording, a MP (or a MP 120) may refer to one of the MPs 120.1-120.N, a SB (or a SB 122) may refer to one of the SBs 122.1-122.N, and a PE (or a PE 118) may refer to one of the PEs 118.1-118.N.

A mixed-scalar-vector instruction set may be defined for the processor 100. The MPs 120.1-120.N, SBs 122.1-122.N, and PEs 118.1-118.N may be vector processing units of the processor 100 and the sequencer 106 may be a scalar processing unit of the processor 100. The instruction set may be designed such that one instruction may be executed by one programmable unit. For example, in one embodiment, each instruction may have 32 bits and certain bits of each instruction (e.g., the most significant 4 bits, the least significant four bits, or other bits) may identify the unit (e.g., the sequencer 106 or one component of the PE array 114) that executes the instruction.

Kernel programs may be made up of series of group of instructions. Scalar instructions may generate parameters used in vector instructions and manage loops and branches. Vector instructions may configure data paths in columns, control data flow and perform data crunching operations. One group of instructions may configure one column. An instruction for a PE including a no-operation (NOP) may be a delimiter of the group. In some embodiments, instructions in one group may be organized such that scalar instructions that generate parameters for vector instructions are placed before vector instructions. Columns do not directly decode vector instructions. Instead, the sequencer 106 may decode scalar and vector instructions, execute decoded scalar instructions and package decoded vector instructions in configurations and send configurations of memory ports (MPs 120.1-120.N), switch boxes (SBs 122.1-122.N), and processing elements (PEs 118.1-118.N) to columns.

In various embodiments, the processor 100 may be configured to perform Single Instruction Multiple Threads (SIMT) execution. A group of threads may form a block (also referred to as a thread block) and a group of blocks may be organized into a grid. A kernel program may define a grid of blocks of threads for execution. Each block and thread may have a unique block and thread identifier (e.g., block ID and thread ID), respectively. The block ID for a block in a three-dimensional grid may be calculated as blockId=blockIdx.x+(blockIdx.y*gridDim.x)+(blockIdx.z*(gridDim.x*gridDim.y)). Variables blockIdx.x, blockIdx.y, and blockIdx.z may be the block ID in the x-axis, y-axis, and z-axis of the block, respectively. Variables gridDim.x and gridDim.y may be grid dimensions in the x-axis and y-axis, respectively. The "*" operator is the multiplication operator. The thread ID for a thread in a three-dimensional block may be calculated as threadId=blockId*(blockDim.x*blockDim.y*blockDim.z)+threadIdx.x+(threadIdx.y*blockDim.x)+(threadIdx.z*(blockDim.x*blockDim.y)). Variables threadIdx.x, threadIdx.y, and threadIdx.z may be the thread ID in the x-axis, y-axis, and z-axis of the thread, respectively. Variables blockDim.x, blockDim.y, and blockDim.z may be block dimensions in the x-axis, y-axis, and z-axis, respectively.

As used herein, the capital letters X, Y, and Z may refer to dimensions of a thread block in the x-axis, y-axis, and z-axis of the block, respectively. In one embodiment, the values for X, Y, and XYZ (e.g., the multiplication product of X times Y times Z) may be set by the system in the local memory of the sequencer 106 before launching a kernel. And the sequencer 106 may load the dimensions (e.g., X, Y, and Z) from the local memory, store the dimensions in a scalar register of the sequencer 106 and deliver them as immediate values in configurations to columns (e.g., MPs in a column).

The sequencer 106 may decode instructions sequentially, and dispatch configurations to one column at a time. In some embodiments, the sequencer 106 may decode one or more vector instructions to be executed by a MP, a SB and a PE together, generate a set of configurations for a MP, a SB and a PE of one column and dispatch the set of configurations to a target column in a batch. There may be a minimum reconfiguration interval that the sequencer 106 may send configurations to the same column. The minimum reconfiguration interval may affect the performance of the processor 100. For example, if a column completes its execution of current set of configurations but the next set of configurations have not been delivered from the sequencer 106, the column may be idle while waiting for the next set of configurations to be delivered. This may occur when thread block sizes are small. Further, if there are scalar instructions that the sequencer 106 has to execute between vector instructions, the reconfiguration interval may become longer.

The configurations for vector processing units may include immediate values generated by executing scalar instructions at the sequencer 106. In many cases, a kernel program executed by the processor 100 may process multiple thread blocks. The kernel program may be initiated at the sequencer for each of the thread blocks. Identical scalar instructions may be executed at the sequencer 106 on different data associated with thread block dependent parameters, for example, block indices. In some embodiments, the sequencer 106 may have a single scalar processor to execute scalar instructions. In these embodiments, each column may receive configurations including immediate values for one thread block, even for a kernel program that may process multiple thread blocks.

In some other embodiments, the sequencer 106 may have a vectorized scalar processor that may be a Single Instruction Multiple Data (SIMD) processor formed by multiple scalar processors which may execute the same scalar instruction in parallel. In these embodiments with the vectorized scalar processor, once a scalar instruction is decoded, each scalar processor in the vectorized scalar processor may concurrently execute the decoded scalar instruction using its own local memory and its own scalar register, generate parameters for one thread block, and store them to its own scalar register. The sequencer may generate configurations that may include multiple vectors of parameters captured from the scalar registers of the scalar processors as multiple vectors of immediate values. Each element of the vector of immediate values may be an immediate value for each of the multiple thread blocks, with the vector may be referred to as a sequencer vector. For a given configuration, each vector processing unit in each column of the plurality of columns of vector processing units may process one thread block using one element of the vector of immediate values at a time and repeat the execution for each element of the vector of immediate values.

The vectorized scalar processor may work for any block size when the same kernel program processes multiple thread blocks. Because one configuration covers multiple thread blocks, the overhead of the configuration switch of a vector processing unit may be reduced, and the utilization factor of a column may be improved. Another advantage is that when the reconfiguration interval of a column is longer than the execution time of one thread block, the idling time of the column may be reduced by repeating the execution for multiple thread blocks. The sequencer 106 in these embodiments may be referred to as a vectorized sequencer.

Figure 2:
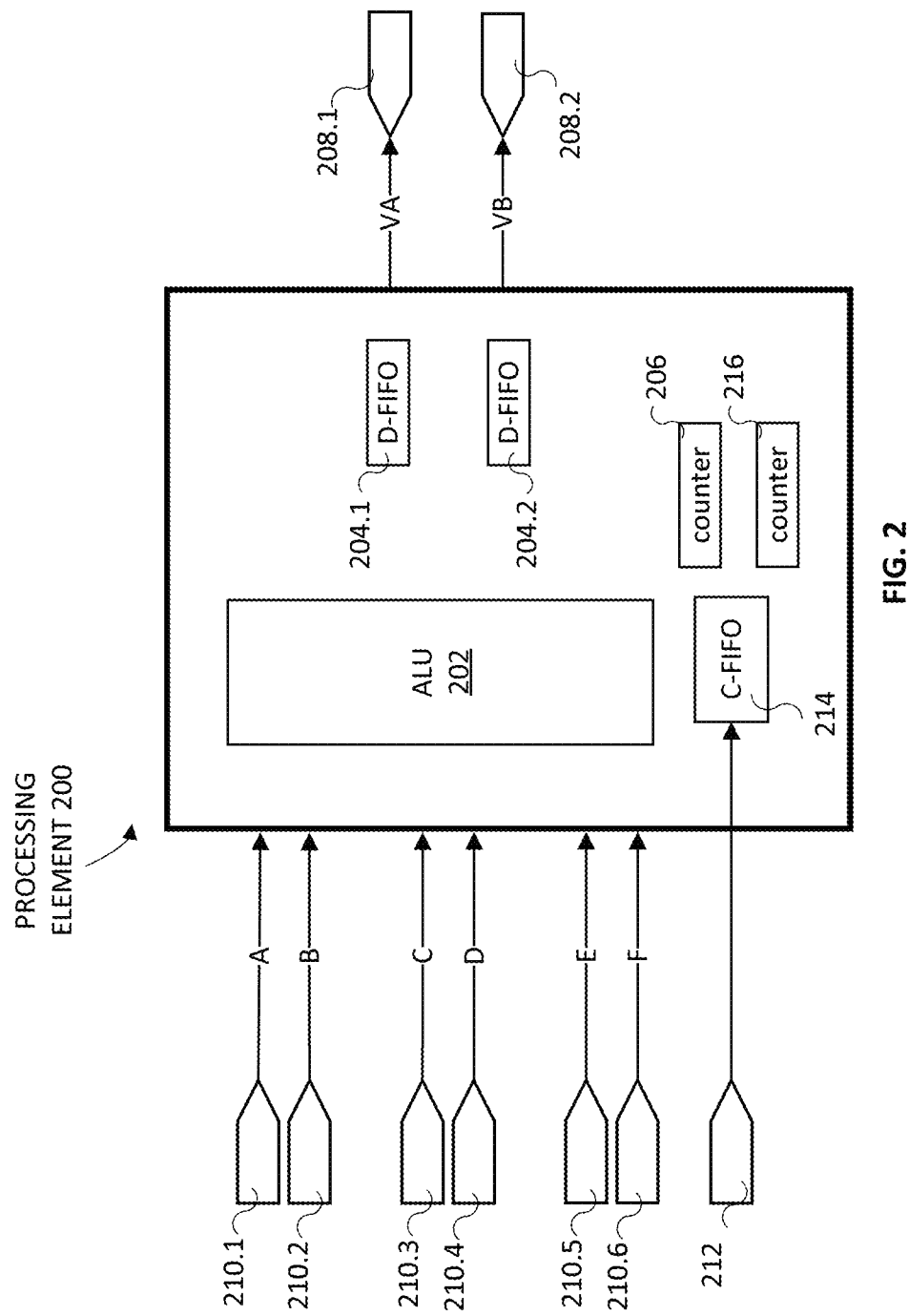
FIG. 2 schematically shows a processing element for a processor in accordance with an embodiment of the present disclosure.

FIG. 2 schematically shows a processing element (PE) 200 in accordance with an embodiment of the present disclosure. The PE 200 may be an embodiment of a PE 118. The PE 200 may comprise an Arithmetic Logic Unit (ALU) 202, a plurality of data buffers (e.g., D-FIFO 204.1, and 204.2), a first counter 206 and second counter 216, a plurality of data outputs (e.g., 208.1 and 208.2), a plurality of data inputs (e.g., 210.1 through 210.6), a configuration input 212 and a configuration buffer (e.g., C-FIFO 214). In one embodiment, the ALU 202 may be one ALU (e.g., one ALU that is configured to process one piece of data at a time and may be referred as a scalar ALU). In most embodiments, the ALU 202 may be a plurality of ALUs (or referred to as a vector ALU), for example, K ALUs, and Single Instruction Multiple Threads (SIMT) operation may be performed by the PE. As used herein, the capital letter K may be referred to as the vector size of ALU and an example K may be 32. It should be noted that the same vector size K may be applied in MPs, SBs, for example, for a vector register and a vector data bus. Please note that a scalar ALU may be a special case of a vector ALU with a vector size being one.

Data received from the data inputs 210.1 through 210.6 may be denoted as A, B, C, D, E, and F. Data sent to the data outputs 208.1 and 208.2 may be denoted as VA and VB. In an embodiment in which the ALU 202 may be one ALU, the widths of the data inputs 210.1 through 210.6 and the data outputs 208.1 and 208.2 may be M bits. The width of the ALU may be configured to be either M bits or 2×M bits by the configuration. If the width is M bits, the inputs of the ALU are A, B, and C. The output of the ALU is VA. If the width is 2×M bits, the inputs of the ALU are (B, A), (D, C) and (F, E). The output of the ALU is (VB, VA). Here (,) denotes concatenation of M-bit data. For example, when M is 8, inputs and outputs of ALU may be 8 bits; when M is 16, inputs and outputs of ALU may be 16 bits; when M is 32, inputs and outputs of ALU may be 32 bits; and so on. Input data pieces A, B, C, D, E, and F, and output data pieces VA and VB may be M bits. In an embodiment in which the ALU 202 may be a vector ALU, the data inputs 210.1 through 210.6 and the data outputs 208.1 and 208.2 may be vectors of K×M bits. And input data pieces A, B, C, D, E, and F, and output data pieces VA and VB may be vectors of K×M bits.

The data buffers 204.1 and 204.2 may be coupled to the data outputs 208.1 and 208.2 to temporarily store data pieces. The data buffers 204.1 and 204.2, which may be mapped to the vector registers VA and VB, respectively, may be used to decouple the timing of PEs from that of the succeeding SBs or the gasket memory. In one embodiment, the buffers may be implemented as FIFOs (e.g., a D-FIFO for a data buffer, a C-FIFO for a configuration buffer).

The configuration buffer C-FIFO 214 may receive configurations from the configuration input 212, which may be coupled externally to the sequencer 106 via the configuration bus, and store the received configurations before any execution of a data path starts. The configurations for the PE 200 may be referred to as PE configurations. The PE 200 may be statically configured while processing a thread block, e.g., the PE 200 may be programmed with instructions specified in the configuration to perform one stage of a pipeline. No instructions may be changed while data in the thread block are passing through the PE 200. One of the configuration parameters XYZ may be used to obtain the number of executions which may be specified by ceil (XYZ/K). Here function ceil(x) returns the least integer value greater than or equal to x. The first counter 206 may be programmed with the number of executions and used to count the data passing through the data output 208.1. When the counter value has reached the number of executions, a new configuration may be applied. Therefore, reconfiguration capability may be provided in each PE. In one embodiment, the specified number of executions for an instruction may be referred to as NUM_EXEC, K threads concurrently executed may be referred to as a warp and this NUM_EXEC may be equal for all components in one data path. For example, for a thread block with the number of threads TH=1024 threads, NUM_EXEC=ceil(1024/32)=32. The first counter 206 may be referred to as a warp counter. The second counter 216 may be used to count for rounds of repetitions for the number of thread blocks to be processed together and referred to as a thread block counter.

Figure 3:
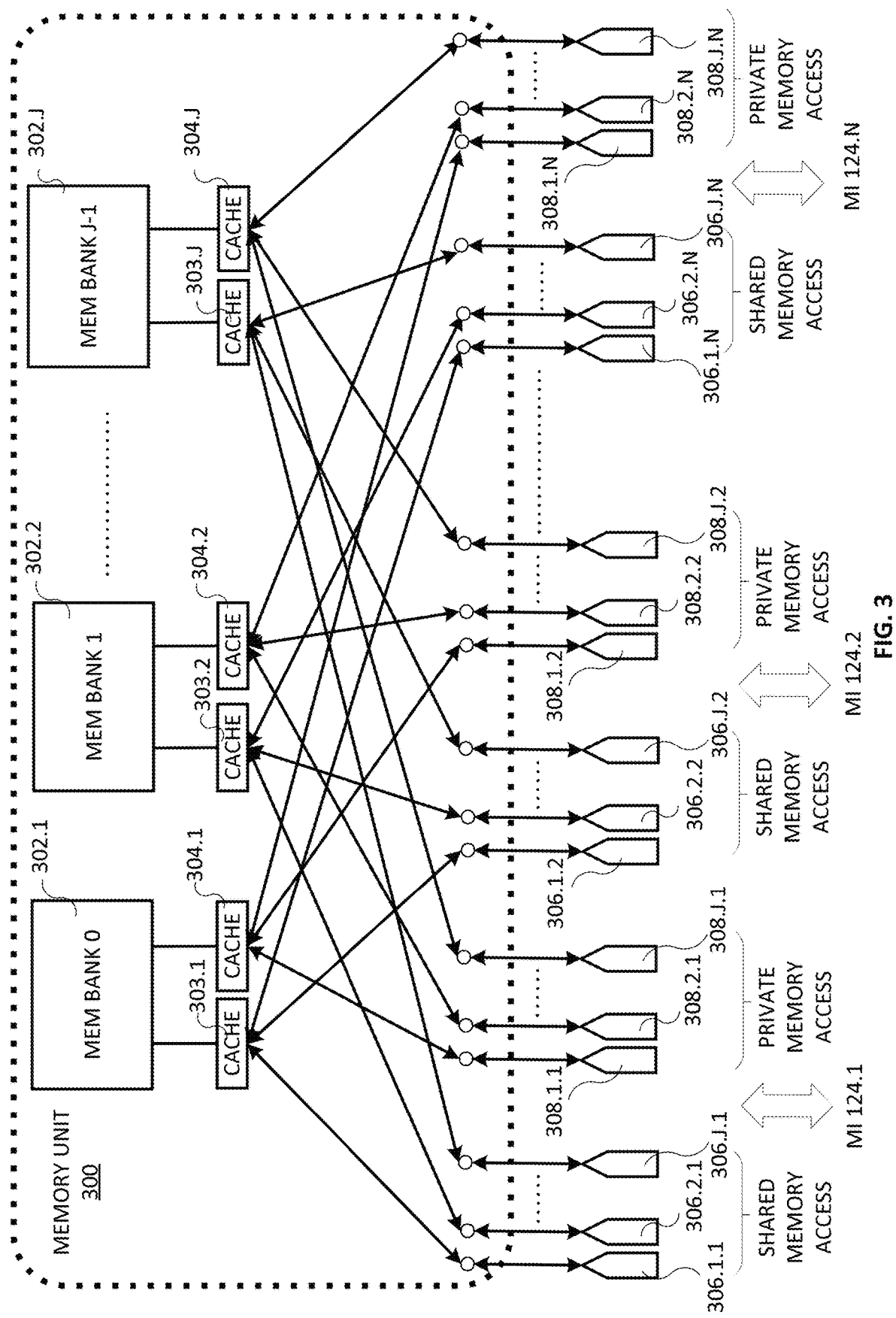
FIG. 3 schematically shows a memory unit for a processor in accordance with an embodiment of the present disclosure.

FIG. 3 schematically shows a memory unit 300 for the processor 100 in accordance with an embodiment of the present disclosure. The memory unit 300 may be an embodiment of the memory unit 112 and may serve as an on-chip cache for the PE array 114. The memory unit 300 may comprise a plurality of memory banks (e.g., memory bank 0 denoted as 302.1, memory bank 1 denoted as 302.2, memory bank J−1 denoted as 302.J, etc.), a plurality of memory caches 303.1 through 303.J for shared memory access and a plurality of memory caches 304.1 through 304.J for private memory access. Each of the memory banks 302.1 through 302.J may be coupled to a respective cache 303 for shared memory access and a respective cache 304 for private memory access. For example, the memory bank 302.1 may be coupled to the cache 303.1 and cache 304.1, the memory bank 302.2 may be coupled to the cache 303.2 and cache 304.2, and so on until the memory bank 302.J may be coupled to the cache 303.J and 304.J. In one embodiment, the memory unit 300 may be a J-way interleaved memory where J may be a power of 2.

Each cache 303 may be individually coupled to all of the plurality of MIs 124.1-124.N for shared memory access via connection ports 306, and each cache 304 may be individually coupled to all of the plurality of MIs 124.1-124.N for private memory access via connection ports 308. Each of the connection ports 306 and 308 may use two subscriptions to identify its connection, with the first subscription identifying the memory cache (by the memory cache subscription 1 to J) and the second subscription identifying the MI (by the MI subscription 1 to N). For example, the connection port 306.1.1 may be for shared memory access for memory cache 303.1 and MI 124.1, the connection port 306.2.1 may be for shared memory access for memory cache 303.2 and MI 124.1, and so on until the connection port 306.J.1 may be for shared memory access for memory cache 303.J and MI 124.1; the connection port 306.1.2 may be for shared memory access for memory cache 303.1 and MI 124.2, the connection port 306.2.2 may be for shared memory access for memory cache 303.2 and MI 124.2, and so on until the connection port 306.J.2 may be for shared memory access for memory cache 303.J and MI 124.2; the connection port 306.1.N may be for shared memory access for memory cache 303.1 and MI 124.N, the connection port 306.2.N may be for shared memory access for memory cache 303.2 and MI 124.N, and so on until the connection port 306.J.N may be for shared memory access for memory cache 303.J and MI 124.N.

Similarly, the connection port 308.1.1 may be for private memory access for memory cache 304.1 and MI 124.1, the connection port 308.2.1 may be for private memory access for memory cache 304.2 and MI 124.1, and so on until the connection port 308.J.1 may be for private memory access for memory cache 304.J and MI 124.1; the connection port 308.1.2 may be for private memory access for memory cache 304.1 and MI 124.2, the connection port 308.2.2 may be for private memory access for memory cache 304.2 and MI 124.2, and so on until the connection port 308.J.2 may be for private memory access for memory cache 304.J and MI 124.2; the connection port 308.1.N may be for private memory access for memory cache 304.1 and MI 124.N, the connection port 308.2.N may be for private memory access for memory cache 304.2 and MI 124.N, and so on until the connection port 308.J.N may be for private memory access for memory cache 304.J and MI 124.N.

It should be noted that both the number of caches 303 and the number of caches 304 may match the number of memory banks, denoted by capital letter J. And the number of MIs 124 may match the number of columns, denoted by capital letter N. The number of memory banks does not need to be identical to the vector size. For example, a vector (e.g., vector ALU, vector address, vector data ports) may have a vector size K, a PE array may have a number of columns N, and a memory unit may have a number of memory banks J. And K, N and J may be all different. In one embodiment, K may be divisible by J, J may be a power of 2, and the bit width of J minus 1 may be L (e.g., L is $\log_2(J)$). For example, J and L may be eight (8) and three (3), respectively, K may be 32 and N may also be 32.

Figure 4A:
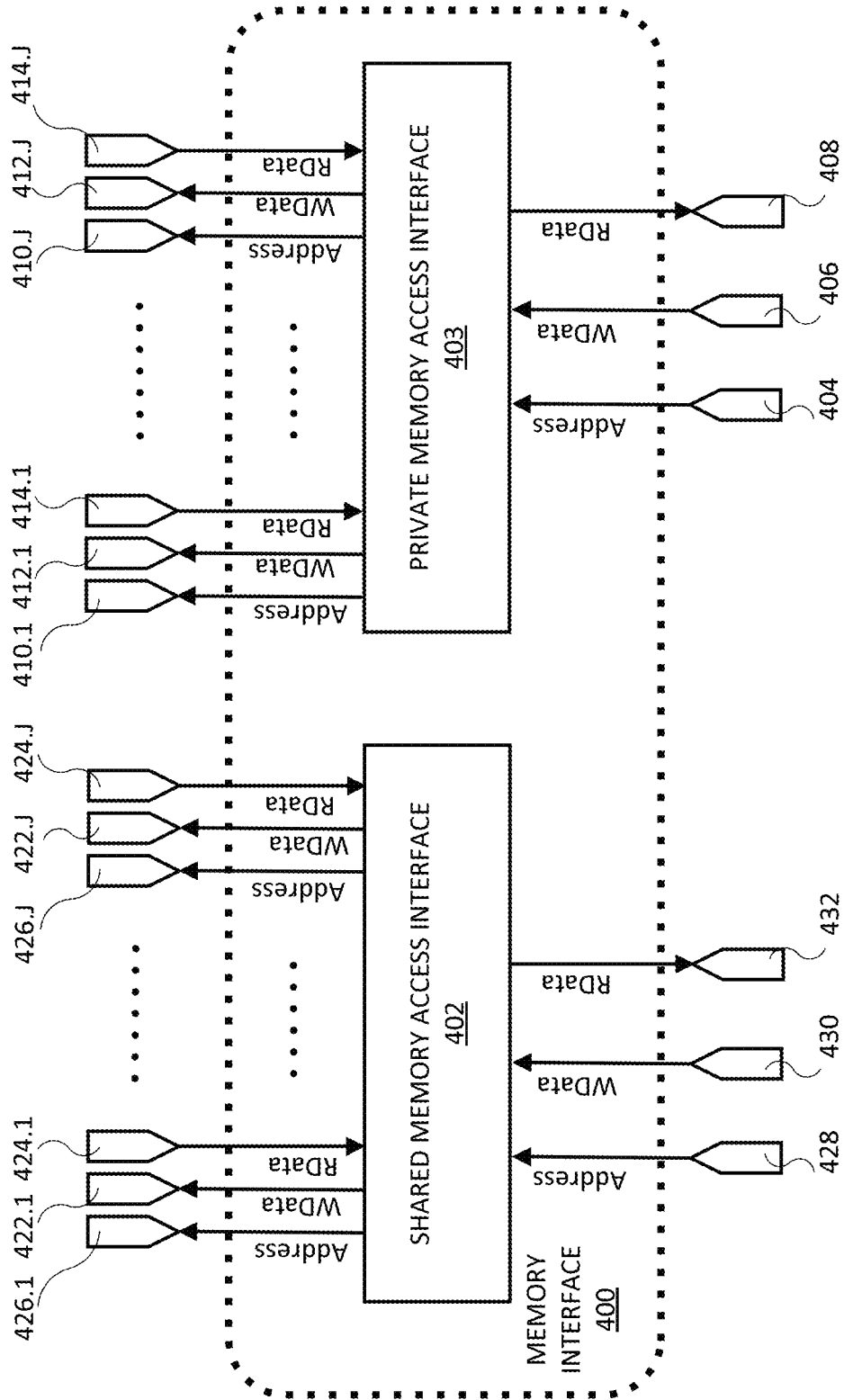
FIG. 4A schematically shows a memory interface in accordance with an embodiment of the present disclosure.

FIG. 4A schematically shows a memory interface (MI) 400 in accordance with an embodiment of the present disclosure. The MI 400 may be an embodiment of MI 124 of FIG. 1. In some embodiments, the memory interface may be referred to as a root box. The MI 400 may comprise a shared memory access interface 402 for shared memory access mode and a private memory access interface 403 for private memory access mode. The private memory access interface 403 may comprise an address port 404, a write data (WData) port 406 and a read data (RData) port 408 coupled to a memory port. The private memory access interface 403 may also comprise a plurality of address ports 410.1-410.J, a plurality of WData ports 412.1-412.J and a plurality of RData ports 414.1-414.J coupled to the memory unit 300. The shared memory access interface 402 may comprise an address port 428, a WData port 430 and a RData port 432 coupled to a memory port. The shared memory access interface 402 may also comprise a plurality of address ports 426.1-426.J, a plurality of WData ports 422.1-422.J and a plurality of RData ports 424.1-424.J coupled to the memory unit 300.

For connections to the memory unit 300, a set of address, WData and RData buses may be coupled to one connection port 306.1.1-306.J.N and 308.1.1-308.J.N shown in FIG. 3. For example, the address port 410.1, WData port 412.1 and RData port 414.1 of MI 124.1 may be coupled to the connection port 308.1.1 of the memory unit 300; the address port 410.J, WData port 412.J and RData port 414.J of MI 124.1 may be coupled to connection port 308.1.1. Meanwhile, the address port 410.1, WData port 412.1 and RData port 414.1 of MI 124.N may be coupled to the connection port 308.1.N of the memory unit 300; the address port 410.J, WData port 412.J and RData port 414.J of MI 124.N may be coupled to connection port 308.J.N

Similarly, the address port 426.1, WData port 422.1 and RData port 424.1 of MI 124.1 may be coupled to the connection port 306.1.1 of the memory unit 300; the address port 426.J, WData port 422.J and RData port 424.J of MI 124.1 may be coupled to connection port 306.1.1. Meanwhile, the address port 426.1, WData port 422.1 and RData port 424.1 of MI 124.N may be coupled to the connection port 306.1.N of the memory unit 300; the address port 426.J, WData port 422.J and RData port 424.J of MI 124.N may be coupled to connection port 306.J.N.

In one embodiment, each of the WData ports and RData ports coupled to a memory port may be configured for vector data connections. For example, the WData port 406 may be a K×M-bit input port, and the RData port 408 may be a K×M-bit output port.

Address ports 404 and 428 may be configured to use vector addresses. In the private memory access mode, K addresses in one vector address may be continuous in ascending order in accordance with the thread ID. Thus, only the address for the thread with the least thread ID may need to be specified by the vector address, and the width of the address port 404 may be G bits, in one embodiment. Also, assuming J is less than or equal to K, the width of data ports of each bank (e.g., 412 and 414) may be (K/J)×M bits. Since the memory unit 300 may be a J-way interleaved memory, the least significant L bits of the address may determine the memory bank where data for the address may reside. Here L may be the bit width of J minus 1. All K data in one vector data may be evenly distributed among all memory banks and accessible without memory contention.

In the shared memory access mode, K addresses in one vector address may be different from each other. Data accessed by the vector address may be randomly spread in all memory banks which may result in memory contention. The width of the address port 428 may be K×G bits. The width of data ports of each bank (e.g., 422 and 424) may be M bits. The shared memory access interface 402 may resolve the memory contention.

Figure 4B:
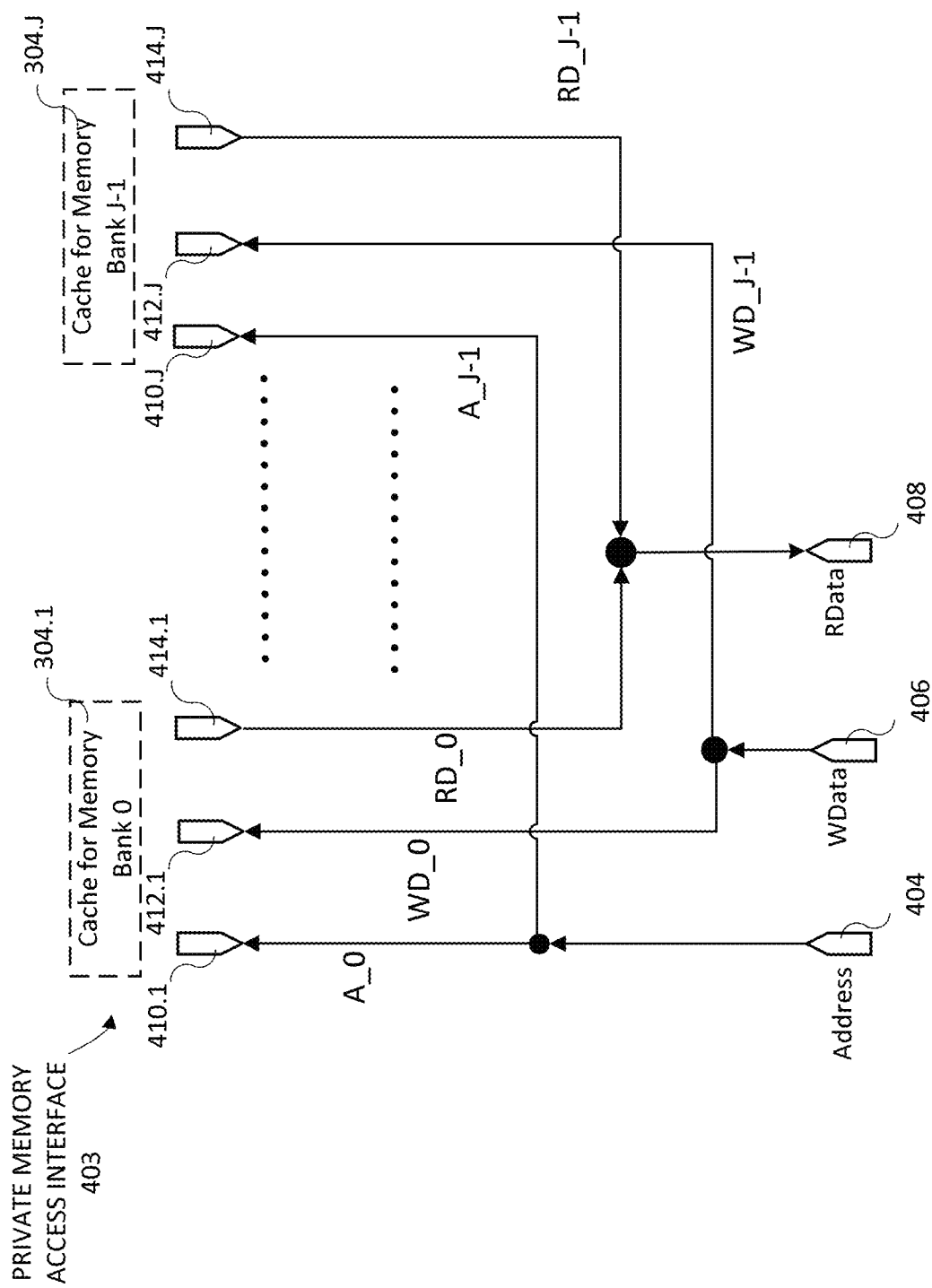
FIG. 4B schematically shows a private memory access interface in accordance with an embodiment of the present disclosure.

FIG. 4B schematically shows the private memory access interface 403 for private memory access in accordance with an embodiment of the present disclosure. The width of the memory address received at the address port 404 may be G bits. By adding 0, 1, 2, . . . , and J−1 to the address at address port 404, J addresses may be created. The least significant L bits of each of J addresses may be examined and the remaining G minus L bits (e.g., G-L bits) may be assigned to one of addresses A_0 through A_J−1 whose index matches the least significant L bits. The addresses A_0 through A_J−1 may be delivered to the memory banks via address ports 410.1 through 410.J. The widths of the vector data at the WData port 406 and at RData port 408 may be K×M bits. K data in the vector may be indexed from 0 to K−1. The least significant L bits of the address at address port 404 may be added to the K indices then the lower L bits of the results may be taken as indices of K data. At WData port 406, data with the same index are concatenated into data of (K/J)×M bits and assigned to one of write data WD_0 through WD_J−1 whose index matches that of concatenated data. The write data WD_0 through WD_J−1 may be delivered to the memory banks via WData ports 412.1 through 412.J. At RData port 408, (K/J)×M bits of read data RD_0 through RD_J−1 may be received from each memory bank via RData ports 414.1 through 414.J. Each read data of (K/J)×M bits may be split into K/J of M-bit data then organized into a K×M-bit vector using the indices in the reversed process of creating (K/J)×M-bit write data WD_0 through WD_J−1 from a K×M-bit vector.

Figure 4C:
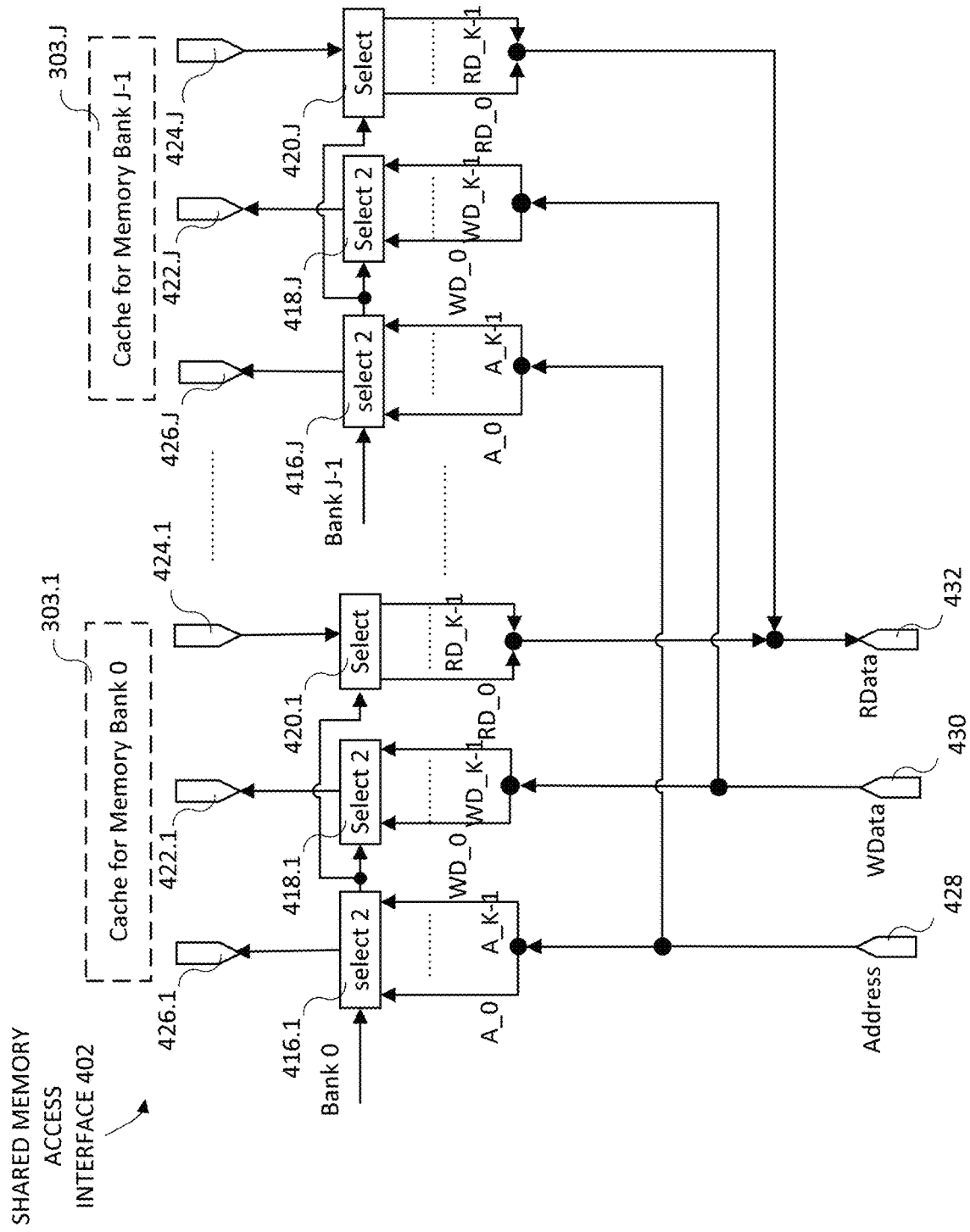
FIG. 4C schematically shows a shared memory access interface in accordance with an embodiment of the present disclosure.

FIG. 4C schematically shows the shared memory access interface 402 for shared memory access in accordance with an embodiment of the present disclosure. The address port 428 may be configured for a vector address of K×G bits, for example, K addresses of G bits as A_0, A_1 . . . , A_K−1. The number K may correspond to the vector size K of the vector ALU in a PE 118. The K addresses may be delivered to a plurality of address selection units (e.g., "Select 2" units 416.1 through 416.J). Each address selection unit 416.1 through 416.J may take the index of each memory bank as an input, for example, index 0 for "Bank 0", . . . , and index J−1 for "Bank J−1", scan the addresses from A_0 to A_K−1, pick up all addresses whose least significant L bits match the bank index, and send remaining G-L bits of the addresses one by one to the memory bank through the address port 426 (e.g., address port 426.1 for memory bank 0 cache 303.1, address port 426.J for memory bank J−1 cache 303.J, etc.). The width of the address port 426 may be G-L bits.

Because more than one address may be directed to the same memory bank, write data selection units (e.g., "Select 2" units 418.1 through 418.J) and read data selection units (e.g., "Select" units 420.1 through 420.J) may be provided to match the data being written to or read from the memory bank with the address sent to the memory bank. Each of the write data selection unit 418.1 through 418.J may receive the index of each address (e.g., 0 to K−1) sent to a corresponding address port 426.1 through 426.J from a corresponding address selection unit 416.1 through 416.J, and send one of the write data (e.g., WD_0 through WD_K−1) with the same index to WData port 422.1 through 422.J (e.g., WData port 422.1 for memory bank 0 cache 303.1, WData port 422.J for memory bank J−1 cache 303.J, etc.). For example, if the address selection unit 416.1 sends G-L bits of A_2, A_15, and A_28 to address port 426.1, the write data selection unit 418.1 receives indices 2, 15, and 28, and sends WD_2, WD_15, and WD_28 to WData port 422.1. Each of the read data selection unit 420.1 through 420.J may receive the index of each address (e.g., 0 to K−1) sent to a corresponding address port 426.1 through 426.J from a corresponding address selection unit 416.1 through 416.J, and assign the data received from RData port 424.1 through 424.J (e.g., RData port 424.1 for memory bank 0 cache 303.1, RData port 424.J for memory bank J−1 cache 303.J, etc.) to one of the read data (e.g., RD_0 through RD_K−1) with the same index. For example, if the address selection unit 416.1 sends G-L bits of A_2, A_15, and A_28 to address port 426.1, the read data selection unit 420.1 receives indices 2, 15, and 28, and assigns the data received from RData port 424.1 to RD_2, RD_15, and RD_28.

Figure 5:
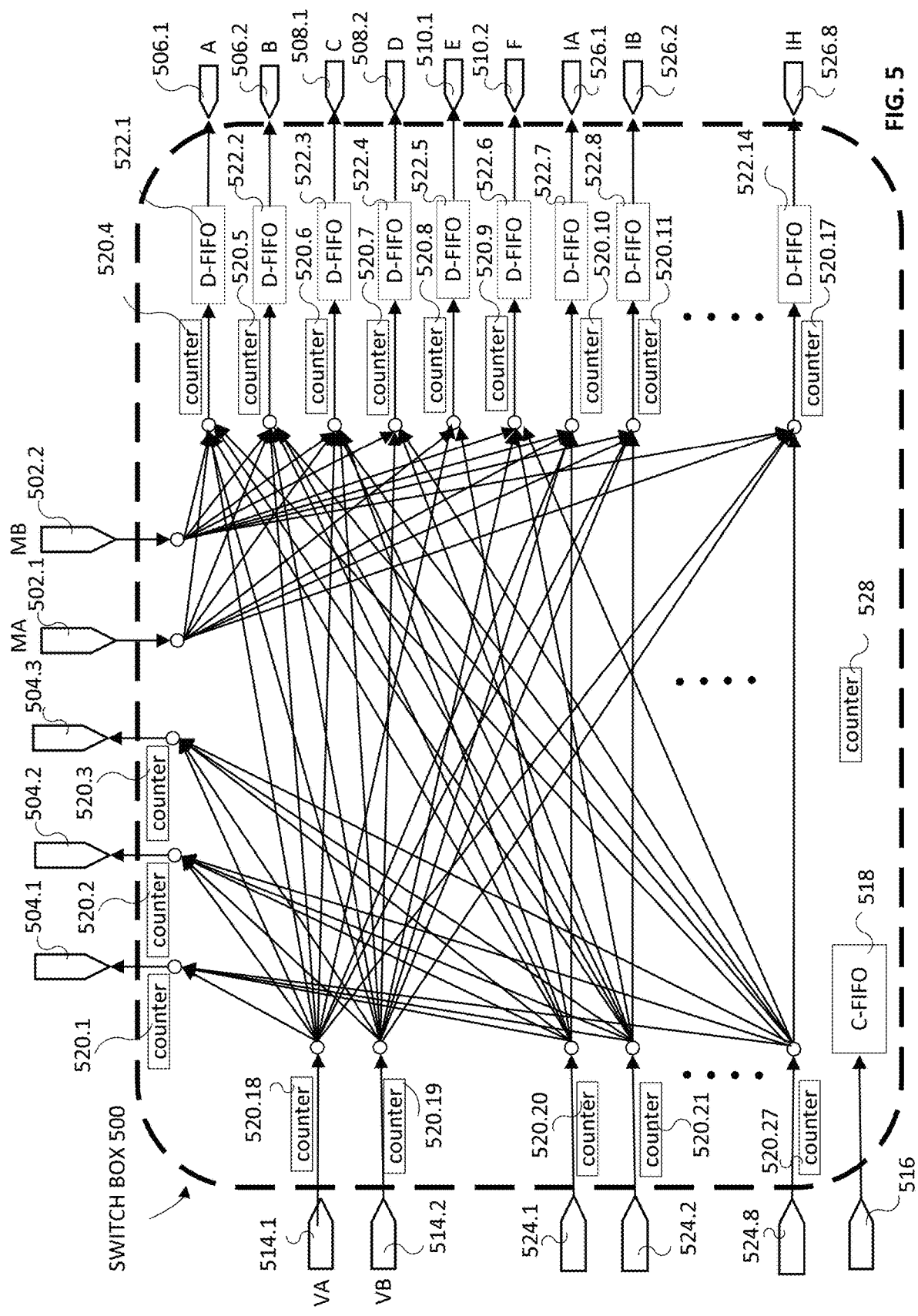
FIG. 5 schematically shows a switch box for a processor in accordance with an embodiment of the present disclosure.

FIG. 5 schematically shows a switch box (SB) 500 in accordance with an embodiment of the present disclosure. The SB 500 may be an embodiment of a SB 122 and may comprise a plurality of data inputs and data outputs, and inter-connections that couple the data inputs to data outputs for data switching. The data inputs of SB 500 may comprise data inputs 502.1, 502.2, 514.1, 514.2 and 524.1 through 524.8. The data outputs of SB 500 may comprise data outputs 504.1 through 504.3, 506.1, 506.2, 508.1, 508.2, 510.1, 510.2 and 526.1 through 526.8.

Externally, the data inputs 502.1 and 502.2 may be coupled to data outputs (e.g., read data ports) of a MP and mapped to the virtual vector registers MA and MB, respectively. One of them may be coupled to a private memory access data output and another may be coupled to a shared memory access data output. The data output 504.1 may be coupled to a data input port of a MP. The data outputs 504.2 and 504.3 may be coupled to data inputs (e.g., write data ports) of a MP, respectively. One of them may be coupled to a private memory access write data port and another may be coupled to a shared memory access write data port. The data inputs 514.1 and 514.2 may be coupled to data outputs 208.1 and 208.2 (e.g., labeled VA and VB) of a PE (or corresponding outputs of the gasket memory in case of SB 122.1), respectively. The data inputs 524.1 through 524.8 may be coupled to data outputs 526.1 through 526.8 of a SB of a preceding column (or corresponding outputs of the gasket memory in case of SB 122.1), respectively. The data outputs of 506.1, 506.2, 508.1, 508.2, 510.1, 510.2 may be coupled to data input ports 210.1 through 210.6 of a PE, respectively. Data pieces output from the data outputs 506.1, 506.2, 508.1, 508.2, 510.1 and 510.2 may be denoted as A, B, C, D, E, and F and data pieces input from the data inputs 514.1 and 514.2 may be denoted as VA and VB. These data pieces A, B, C, D, E, and F may be the input data to a PE 118 and VA and VB may be output data from a PE 118 as described herein.

The SB 500 may further comprise a configuration buffer 518 and a corresponding configuration input 516. The configuration buffer 518 may be implemented as a First-In-First-Out buffer and referred to as C-FIFO 518. The configuration input 516 may be coupled externally to the configuration bus that is coupled to the sequencer 106 for the SB 500 to receive configurations from the sequencer 106. The configurations for the SB 500 may be referred to as SB configurations. Moreover, the SB 500 may further comprise a plurality of counters 520.1-520.27. With the exception of the data inputs 502.1 and 502.2, each of other data inputs and all data outputs may have a corresponding counter 520. In addition, the SB 500 may also comprise a plurality of data buffers 522.1-522.14, which may be implemented as a data First-In-First-Out buffer and referred to as D-FIFO 522.1-522.14. Each of the D-FIFO 522.1-522.14 may provide a respective output buffer for each of the data outputs 506.1, 506.2, 508.1, 508.2, 510.1, 510.2 and 526.1-526.8. D-FIFO 522.7-522.14 may be mapped to the vector registers IA IB, IC, ID, IE, IF, IG, and IH, respectively.

Inside the SB 500, the data input 502.1 may be coupled to the data outputs 506.1, 506.2, 508.1, 510.1 and 526.1 through 526.8. The data input 502.2 may be coupled to the data outputs 506.1, 506.2, 508.1, 508.2, 510.2 and 526.1 through 526.8. The data input 514.1 may be coupled to the data outputs 504.1-504.3, 506.1, 506.2, 508.1, 510.1, and 526.1 through 526.8. The data input 514.2 may be coupled to the data outputs 504.2, 504.3, 506.1, 506.2, 508.1, 508.2, 510.2 and 526.1 through 526.8. Each of the data inputs 524.1, 524.3, 524.5, and 524.7 may be coupled to the data outputs 504.1-504.3, 506.1, 506.2, 508.1, 510.1, and a corresponding one of outputs 526.1, 526.3, 526.5, and 526.7. Each of the data inputs 524.2, 524.4, 524.6, and 524.8 may be coupled to the data outputs 504.1-504.3, 506.1, 506.2, 508.1, 508.2, 510.2 and a corresponding one of outputs 526.2, 526.4, 526.6, and 526.8. For example, data input 524.1 may be coupled to 504.1-504.3, 506.1, 506.2, 508.1, 510.1, and 526.1, data input 524.2 may be coupled to 504.1-504.3, 506.1, 506.2, 508.1, 508.2, 510.2 and 526.2, etc. It should be noted that inside the SB 500, the coupling between an input and an output may be switched on (e.g., connected) or off (e.g., disconnected) based on a current configuration being applied at the SB 500. Moreover, D, E, and F ports of a PE may be for 2×M-bit configuration. Only higher M bits of register pairs (e.g., VB, IB, ID, IF, IH, and MB) may be assigned to D and F, and only lower M bits of register pairs (e.g., VA, IA, IC, IE, IG, and MA) may be assigned to E.

Each of the counters 520.1-520.27 at the data ports may be independently responsible for counting data passing through the data port. When one or more configurations may be loaded into the C-FIFO 518, each configuration may specify the number of executions (e.g., NUM_EXEC). These counters 5201.-520.27 may be referred to as warp counters. The SB 500 may also comprise a counter 528 as a thread block counter. During execution of one configuration, all counters 520.1-520.27 may independently count the numbers of data passing through the data ports. When all the warp counters reach the number of executions specified in the configuration, the thread block counter 528 may count one and all warp counters 520.1-520.27 may be cleared. If the thread block counter 528 count to a vector size specified for the number of thread blocks to be repeatedly executed, a next configuration in the C-FIFO 518 may be applied. Otherwise, the execution may be repeated for the next thread block.

A similar approach of using the warp counters and thread block counters may be applied inside a PE 118, and a memory port 120. Because these counters may facilitate configuration and reconfiguration of each component that may have such counters, these counters may be referred to as reconfiguration counters and a component that has such counters may be referred to as a reconfigurable unit. An embodiment of a processor 100 may provide massive parallel data processing using the various reconfigurable units and may be referred to as a reconfigurable parallel processor (RPP).

Figure 6:
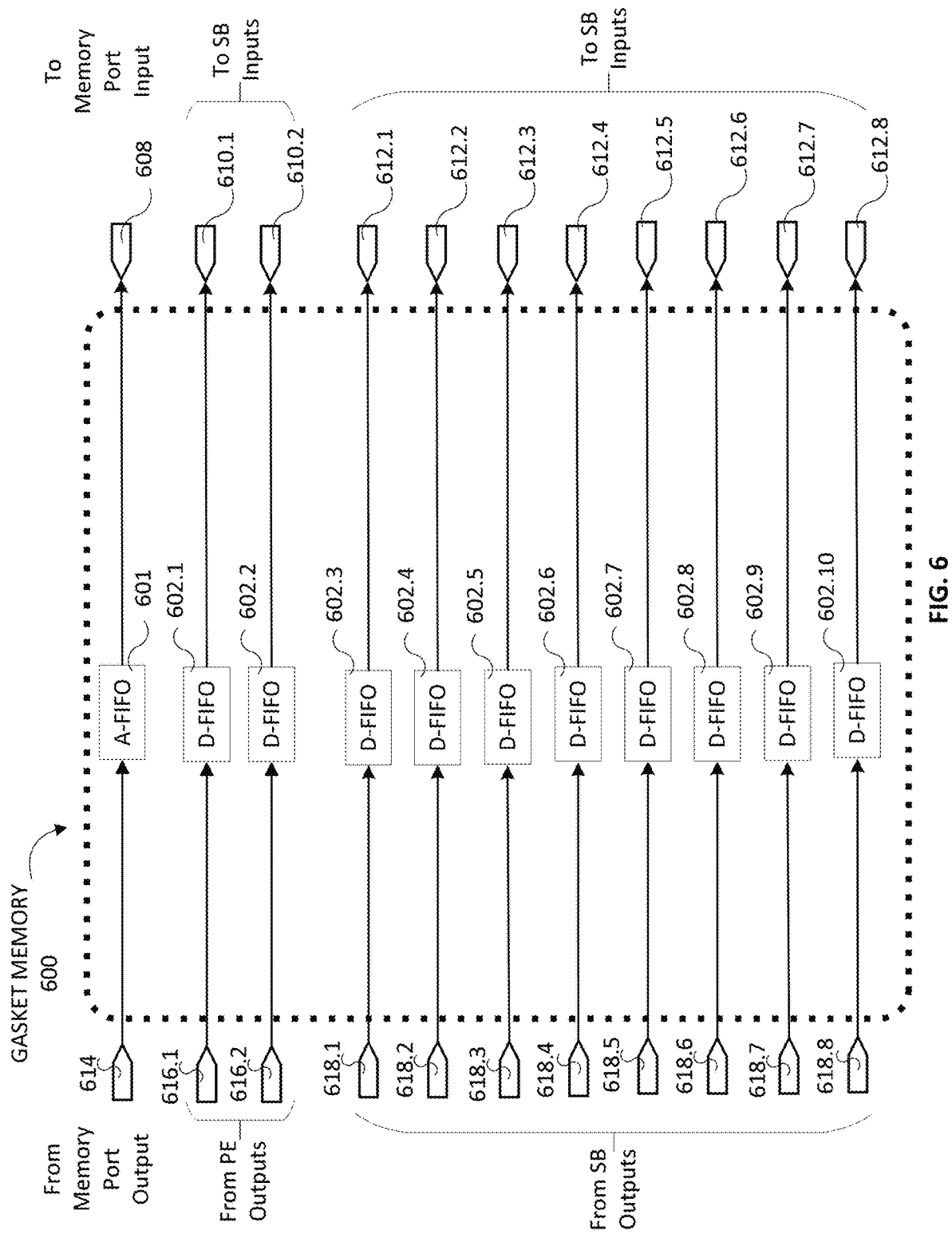
FIG. 6 schematically shows a gasket memory for a processor in accordance with an embodiment of the present disclosure.

FIG. 6 schematically shows a gasket memory 600 in accordance with an embodiment of the present disclosure. The gasket memory 600 may be an embodiment of the gasket memory 116 shown in FIG. 1. The gasket memory 600 may comprise a plurality of buffers for temporary storage of data and one buffer for address. The data buffers may be implemented as First-In-First-Out (FIFO) buffers and referred to as D-FIFOs (e.g., D-FIFO 602.1-602.10). The address buffer may be implemented as an address FIFO (e.g., A-FIFO 601). In addition, the gasket memory 600 may comprise a plurality of data inputs (e.g., 614, 616.1-616.2, and 618.1-618.8), and a plurality of data outputs (e.g., 608, 610.1-610.2, and 612.1-612.8).

The input 614 may be coupled to an output of MP 120.N and the output 608 may be coupled to an input of MP 120.1. Inside the gasket memory 600, the A-FIFO 601 may be coupled between the input 614 and output 608. The inputs 616.1 and 616.2 may be coupled to outputs 208.1 and 208.2 of PE 118.N, respectively. The outputs 610.1 and 610.2 may be coupled to inputs 514.1 and 514.2 of SB 122.1. Inside the gasket memory 600, the D-FIFO 602.1 may be coupled between the input 616.1 and output 610.1, and the D-FIFO 602.2 may be coupled between the input 616.2 and output 610.2. The inputs 618.1-618.8 may be coupled to outputs 526.1-526.8 of SB 122.N, respectively. The outputs 612.1-612.8 may be coupled to inputs 524.1-524.8 of SB 122.1, respectively. Inside the gasket memory 600, the D-FIFOs 602.3-602.10 may be coupled between the inputs 618.1-618.8 and outputs 612.1-612.8, respectively.

Figure 7:
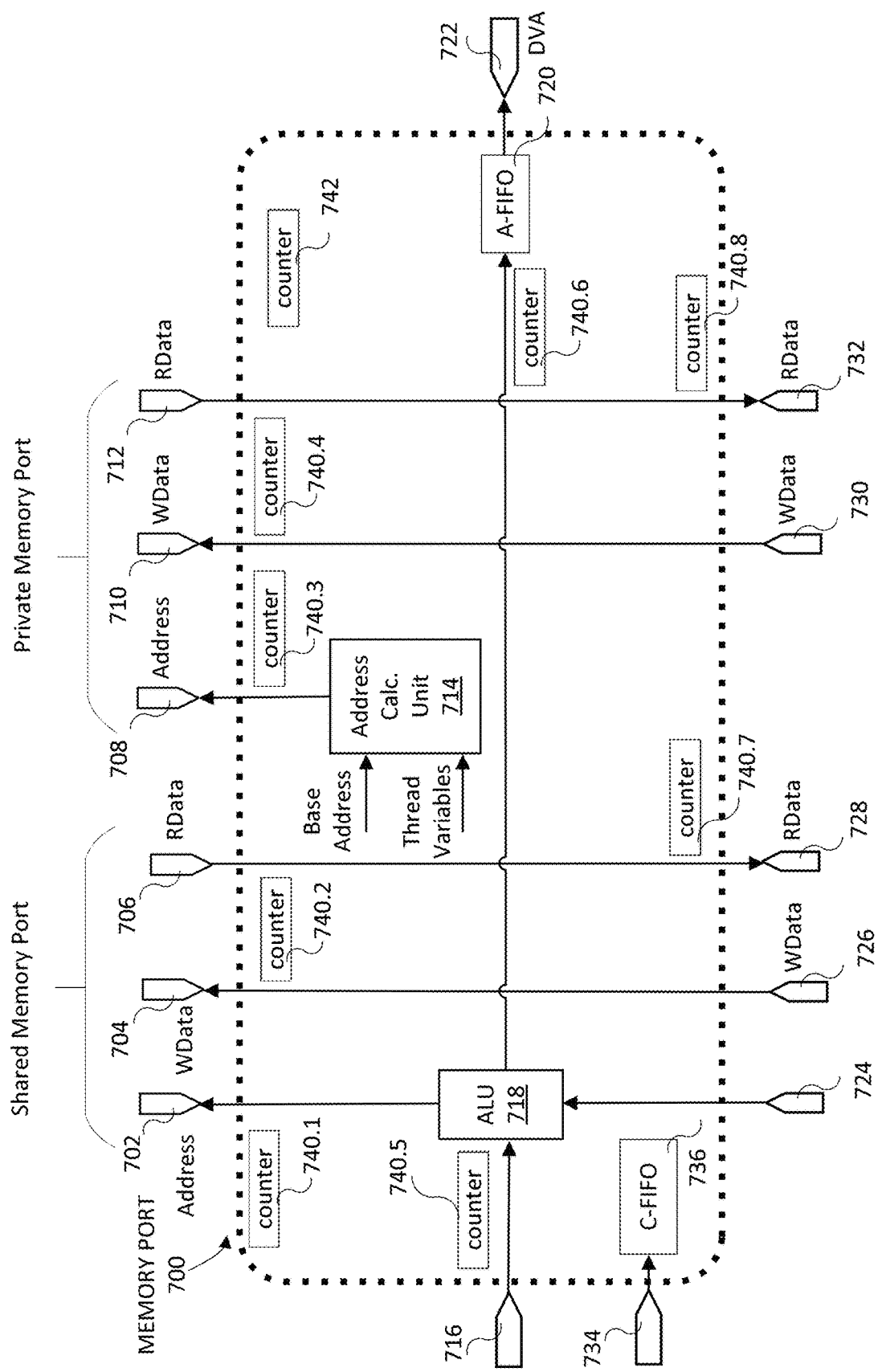
FIG. 7 schematically shows a memory port for a processor in accordance with an embodiment of the present disclosure.

FIG. 7 schematically shows a memory port 700 for a processor in accordance with an embodiment of the present disclosure. The memory port 700 may comprise an address port 702, a WData port 704 and a RData port 706 to be coupled to the address port 428, WData port 430 and RData port 432 of a shared memory access interface 402, respectively; an address port 708, a WData port 710 and a RData port 712 to be coupled to the address port 404, WData port 406 and RData port 408 of a private memory access interface 403, respectively; a data port 724, a WData port 726, a RData port 728, another WData port 730 and another RData port 732 to be coupled to the data ports 504.1, 504.2, 504.3, 502.1 and 502.2 of a SB 500, respectively.

The memory port 700 may further comprise a configuration input 734 and a configuration buffer (e.g., C-FIFO) 736.

MP configurations may include instructions to be performed at a MP, for example, LOAD and STORE instructions to load data from the memory unit and to store data to the memory unit. The memory port 700 may further comprise an address input port 716, an ALU 718, an address buffer (e.g., A-FIFO) 720, and an address output port 722. The address input port 716 may be coupled to the address output port 722 of a MP of a preceding column (or the address output port 608 of the gasket memory 600 in case of MP 120.1), and the address output port 722 may be coupled to the address input port 716 of a MP of a succeeding column (or the address input port 614 of the gasket memory 600 in case of MP 120.N). The ALU 718 may perform operations on the addresses received from the address port 716 and the data received from the data port 724, and output the result addresses to the address port 702. Also, the ALU 718 may output the result addresses to the address port 722 or pass the addresses received from the address port 716 to the address port 722. The A-FIFO 720 may temporarily store the addresses from the ALU 718 before the addresses being output from the address port 722. The A-FIFO 720 may be mapped to the vector register DVA.

The memory port 700 may also comprise an address calculation unit 714. The address calculation unit 714 may be configured to generate memory addresses for private memory access using a base address and thread variables. The base address may be a starting memory address for data of a block (or a grid) of threads. The thread variables may include the block parameters, such as, but not limited to, the block (or grid) dimensions. The base address and thread variables may be delivered to the MP 700 in a MP configuration.

The memory port 700 may further comprise a plurality of counters 740.1-740.8 for counting the number of executions of one configuration (e.g., NUM_EXEC). Each of the counters 740 may be associated with a data port or address port. Each of the counters 740.1-740.8 may be independently responsible for counting data passed the associated ports. For example, the counter 740.1 may be associated with the address port 702, the counter 740.2 may be associated with the WData port 704, the counter 740.3 may be associated with the address port 708, the counter 740.4 may be associated with the WData port 710, the counter 740.5 may be associated with the address input port 716, the counter 740.6 may be associated with the address output port 722, the counter 740.7 may be associated with the RData port 728, and the counter 740.8 may be associated with the RData port 732. The counters 740.1-740.8 may be warp counters. The MP 700 may also comprise a counter 742 as a thread block counter. During execution of one configuration, all counters 740.1-740.8 may independently count the numbers of data passing through the data ports. When all the warp counters reach the number of executions specified in the configuration, the thread block counter 742 may count one and all warp counters 740.1-740.8 may be cleared. If the thread block counter 742 count to a vector size specified for the number of thread blocks to be processed together, a next configuration in the C-FIFO 736 may be applied. Otherwise, the execution may be repeated for the next thread block.

Figure 8A:
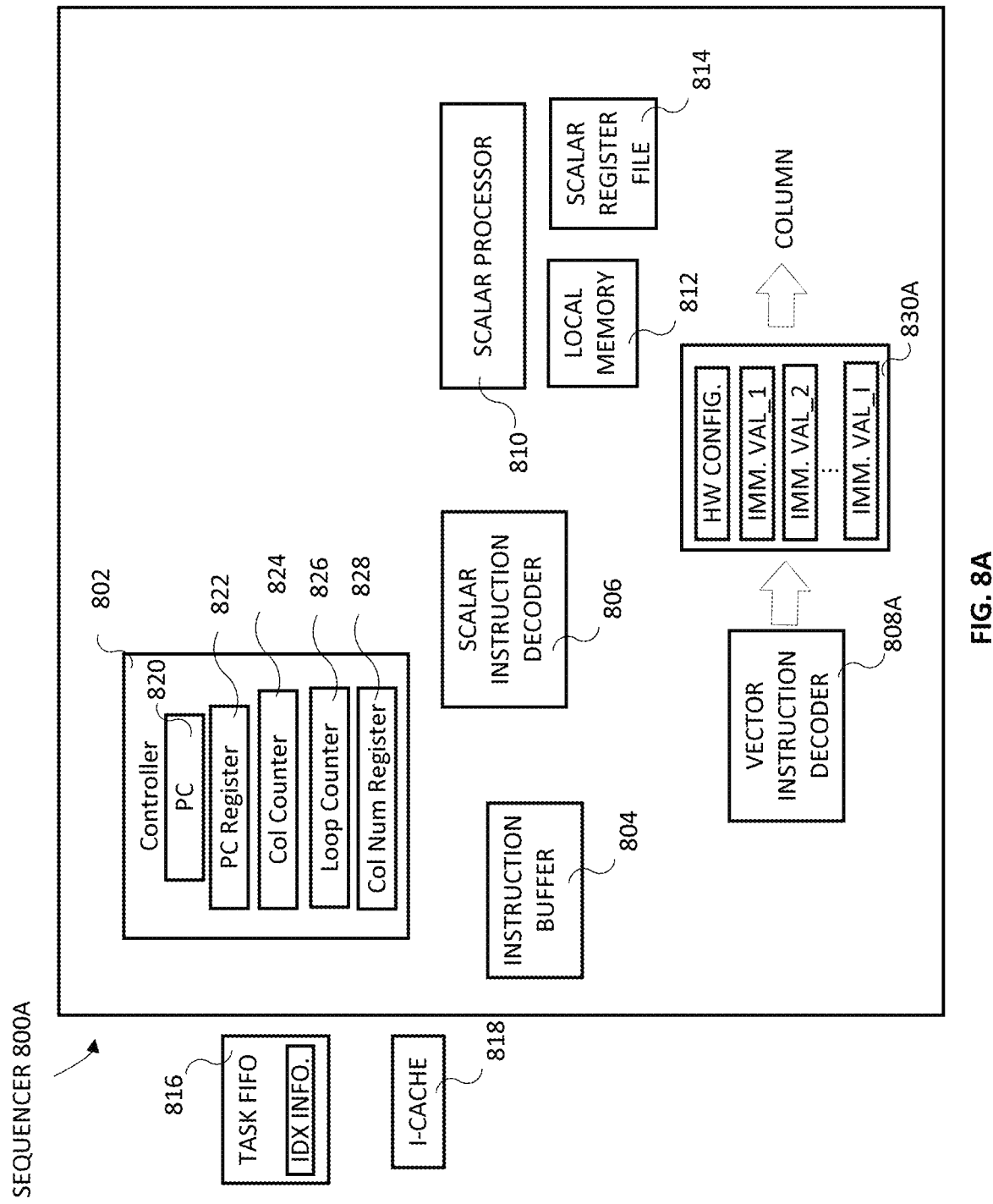
FIG. 8A schematically shows a sequencer for a processor in accordance with an embodiment of the present disclosure.

FIG. 8A schematically shows a sequencer 800A for a processor in accordance with an embodiment of the present disclosure. The sequencer 800A may be an embodiment of the sequencer 106 of FIG. 1, and may decode kernel programs, execute decoded scalar instructions, package decoded vector instructions into configurations and deliver the configurations to columns.

The sequencer 800A may be coupled to a task buffer (e.g., task FIFO) 816 and an instruction cache (e.g., i-Cache) 818. Information of a kernel such as base address of the program, job identifier (e.g., job ID), and thread block index information (e.g., IDX INFO., which may include block identifier (e.g., block ID) and block indices) may be transferred to the sequencer 800A via the task buffer 816. In one embodiment, the task buffer 816 and the instruction cache 818 may be part of the configuration memory 104 of FIG. 1. During operation, kernel information may be written to the task buffer 816 by external devices. When the task buffer 816 is not empty, the sequencer 800A may start processing a kernel after reading kernel information from the task buffer 816, then retrieve instructions from the instruction cache 818 for decoding, and stop when an end-of-program instruction is decoded. The sequencer 800A may be idle when the task buffer 816 is empty.

In some embodiments, the kernel information may include a bit to indicate whether the sequencer 802 should work in a continuous mode. If the bit is set, the sequencer 800A may continuously read kernel information from the task buffer 816 and fetch kernel programs. Otherwise, the sequencer 800A may monitor status of columns (e.g., of PE array 114) and wait until all columns become inactive before reading the next kernel information from the task buffer 816.

The sequencer 800A may comprise a controller 802, an instruction buffer 804, a scalar instruction decoder 806, a vector instruction decoder 808A, a scalar processor 810, a local memory 812, and a scalar register file 814. The controller 802 may fetch instructions from the instruction cache 818 and put the fetched instructions in the instruction buffer 804. In one embodiment, the instruction buffer 804 may be a circular buffer to hold a number of instructions (e.g., 64 or another number). During operation, for example, the controller 802 may fetch 64 instructions at the beginning of a kernel to fill the instruction buffer 804.

The fetched instructions may include scalar instructions and vector instructions mixed together. Certain bits of an instruction (e.g., the most significant 4 bits, the least significant four bits, or other bits) may specify a hardware unit designated to execute the instruction. The controller 802 may examine these bits and determine whether an instruction is a scalar instruction or a vector instruction based on the designated hardware unit.

The instruction buffer 804 may have an instruction pointer pointing to an instruction in the instruction buffer 804 as the next instruction to be processed. The next instruction to be processed may also be pointed to by a Program Counter (PC) 820 in the controller 802. The controller 802 may determine whether an instruction is a scalar instruction or a vector instruction, and direct scalar instructions to be sent to the scalar instruction decoder 806 and vector instructions to be sent to the vector instruction decoder 808A. In some embodiments, the scalar instruction decoder 806 may decode one scalar instruction in one cycle and the vector instruction decoder 808A may decode a plurality of vector instructions in one cycle. For example, in one embodiment, the vector instruction decoder 808A may decode up to 8 vector instructions in one cycle. However, if a vector instruction refers one or more registers in the scalar register file 814 and the one or more registers are not ready yet, wait cycles may be inserted. The PC 820 may be incremented by one when the scalar instruction decoder 806 decodes a scalar instruction. When the vector instruction decoder 808A decodes vector instructions, the PC 820 may be incremented by the number of decoded vector instructions.

The sequencer 800A may sequentially process instructions in the order stored in the instruction cache 818. Scalar instructions decoded by the scalar instruction decoder 806 may be executed on the fly by controller 802 and the scalar processor 810. Scalar instructions may generate parameters used to configure columns and manage loops and branches. The vector instruction decoder 808A may decode vector instructions to generate configurations for vector processing units. Vector instructions may configure data paths in columns, control data flow and process data in parallel threads. For example, vector instructions for the memory ports (e.g., MPs 120) may include memory access instructions, such as but not limited to, LOAD and STORE; vector instructions for the switch boxes (e.g., SBs 122) may include data copy instructions, such as but not limited to, MOVE and FORWARD; and vector instructions for the processing elements (e.g., PEs 118) may include arithmetic and logical instructions, such as but not limited to, ADD and SUBTRACT, etc.

FIG. 8A shows a configuration 830A as an example of a configuration generated by the vector instruction decoder 808A and delivered to the columns. The configuration 830A may include a field for hardware configuration and a field for a set of immediate values (e.g., IMM. VAL_1 to IMM. VAL_I). The field for hardware configuration may include one or more instructions to be performed at vector processing units. The set of immediate values may include parameters for the instructions. The maximum number of parameters for the vector processing units (e.g., a MP, a PE, and a SB) is given by the capital letter "I". Each of the immediate values IMM. VAL_1 to IMM. VAL_I may represent a value of a respective parameter.

In some embodiments, configurations may be broadcasted to all columns. One of the columns may be a destination or target column for one set of configurations, each column may have a separate single line coupled to the sequencer for transmitting a valid bit. The scalar instruction decoder 806 may assert the valid bit to select a target column when the configuration buffer of the target column is not full. That is, when the configuration buffer of the target column (e.g., configuration buffers of MP, PE, SB of the target column) has available space, the valid bit for the target column may be asserted for the configurations to be received by the target column.

The configuration buffer size for the vector processing units may be larger than one configuration unit size so that there is no need for the sequencer 800A and columns to be synchronized. That is, each of the vector processing units may hold more than one configuration at any time and each column of vector processing units may execute decoded vector instructions in an asynchronous manner with respect to the sequencer 800. Therefore, the sequencer 800A may complete configuration dispatch before columns complete program execution. In at least one embodiment, the sequencer 800A may monitor whether columns are active or inactive but does not monitor which instructions columns are executing.

The destination column may be sequentially selected one at a time in the order of column number. Because the columns may be chained in a loop (e.g., MPs chained from MP 120.1 through 120.N then back to MP 120.1 via the gasket memory 116, SBs and PEs chained from SB 122.1 to PE 118.1 through SB 122.N to PE 118.N then back to SB 122.1 via the gasket memory 116), execution of a kernel program may select any column as a starting column. In one embodiment, the first column of the PE array 114 (e.g., the MP 120.1, SB 122.1, and PE 118.1) may be selected to start execution of a kernel program and other columns may be sequentially selected one at a time in the order of column number.

Kernel specific parameters may be set in the local memory 812 by external devices before the kernel is initiated. The local memory 812 may be Random Access Memory (RAM) (e.g., DRAM, SRAM, etc.). While executing some scalar instructions, the scalar processor 810 may read these parameters from local memory 812, process the parameters, and store the parameters to scalar registers of the scalar register file 814. The scalar register file 814 may be shared by the scalar processor 810 and vector instruction decoder 808A. The vector instruction decoder 808A may obtain the kernel specific parameters from the scalar register file 814 and deliver them to columns as immediate values in configurations. In addition, parameters (e.g., used to configure columns) generated by the scalar processor 810 executing scalar instructions may also be passed over to the vector instruction decoder 808A using the scalar register file 814. In some embodiments, the scalar register file 814 may comprise a plurality of scalar registers. For example, in one embodiment, the scalar register file 814 may comprise 32 16-bit scalar registers denoted as R0 to R31.

The scalar processor 810 may comprise a scalar ALU and a Load/Store Unit. In one embodiment, the ALU may include an integer unit, a floating-point unit, a move unit, and a compare unit. Each of these units may be implemented in a multi-stage pipeline. The Load/Store Unit may also be implemented as multi-stage pipelines. The Load Unit may read data from the local memory 812 and store them to the scalar registers of the scalar register file 814. The Store Unit may write contents of the scalar registers of the scalar register file 814 to the local memory 812.

The scalar instructions decoded by the scalar instruction decoder 806 may include control flow instructions that may be executed by the controller 802. In some embodiments, the control flow instructions may include, but not limited to, repeat, jump, poll, and barrier instructions. A jump instruction is to change the execution flow from the next instruction in a current sequence of instructions to a destination instruction pointed by the jump instruction. A poll instruction is to let the controller 802 stop fetching instructions and wait until the DMA operation is done (e.g., DMA module 102 finishes). The poll instruction may synchronize the sequencer 800A and columns. When a barrier instruction is executed, the controller 802 may stop fetching instructions and wait until all columns become inactive. The barrier instruction may synchronize the sequencer 800A and columns.

In some embodiments, the controller 802 may comprise separate hardware units each configured to execute a different type of instruction assigned to the controller 802. For example, the controller 802 may comprise a hardware unit for executing the jump instructions, another hardware unit for executing the poll instructions and yet another hardware unit for executing the barrier instructions.

For repeat instructions, the controller 802 may be equipped with a PC register 822, a column counter 824, a loop counter 826, and a column number register 828. In one embodiment, these hardware units may be contained in one hardware unit designated for repeat instructions. When a repeat instruction is executed, the controller 802 may capture the current value of the PC 820 in the PC register 822, clear the column counter 824, set the loop counter 826 to the total number of times the instruction to be repeatedly executed, and set the column number register 828 to a number of columns to be repeated. The latter 2 values may be provided by the repeat instruction. The controller 802 may increment the column counter 824 when configurations are sent to a column. If the column counter value in the column counter 824 is equal to the column number register value in the column number register 828, the controller 802 may clear the column counter 824 and decrement the loop counter 826. If the loop counter value in the loop counter 826 is not zero, the controller 802 may replace the value in the PC 820 with the PC register value in the PC register 822 to jump back to the start point of the loop. If the loop counter value is zero, the controller 802 may exit the loop.

The sequencer 800A may decode instructions sequentially, and dispatch configurations to one column at a time. A column may be idle after completing its current set of configurations and has to wait for the next set of configurations to be delivered from the sequencer 800A. The minimum reconfiguration interval may depend on how long it takes for the sequencer 800A to generate and deliver the next set of configurations. It may take one or more scalar instructions to prepare parameters for subsequent vector instructions. In one embodiment, the sequencer 800A may decode up to 8 vector instructions in one cycle and generates 3 configurations in parallel, one for PE, one for SB, and one for MP. And one or two of configurations may be NOPs (e.g., no-operations). Those configurations may be independently routed to C-FIFOs of PE, SB, and MP via 3 configuration buses.

For example, assume the sequencer 800A may consume 1 cycle to execute one scalar instruction and there are 2 scalar instructions and 4 vector instructions on average for one column, the sequencer 800A may consume 3 cycles to deliver configurations per column (2 cycles for executing 2 scalar instructions and 1 cycle for decoding 4 vector instructions). The average reconfiguration interval may be 96 cycles (3 cycles×32 columns). If the thread block size is 768, there are 768 threads in a thread block. Each column may complete the operation in 24 (=768/32) cycles and may be idle for the next 72 cycles. It should be noted that the 4 vector instructions may be decoded concurrently and a set of 3 configurations for a column may be generated with one configuration for a MP, another configuration for a SB and a third configuration for a PE. One configuration for a vector processing unit may include more than one decoded vector instruction. For example, a MP has an ALU and 2 read/write ports, one for shared memory access and the other for private memory access. Thus, one MP may execute an ADD instruction to increment addresses and 2 STORE instructions in parallel. Also, a SB may execute 2 MOVE instructions and a COPY instruction in parallel (e.g., a MOVE instruction to forward an input 514.1 from a PE in the preceding column to one of outputs 526, a MOVE instruction to forward an input 502.1 from a MP in the same column to one of outputs 526, and a COPY instruction to forward some of inputs 524 from a SB in the preceding column to some of outputs 526). A PE may also execute two decoded vector instructions, for example, ADD and CVT, in which ADD may be an addition operation and CVT may be a conversion operation (e.g., converting from floating point to integer) for the results of the addition operation. Therefore, in at least one embodiment, one set of configurations may include at least 3 and up to 8 decoded instructions including NOPs for the MP, SB and PE of a column.

The performance of the processor 100 with the sequencer 106 being an embodiment of the sequencer 800A may be significantly degraded if a thread block size is small. Suppose the thread block size is 256 (e.g., 256 threads in a thread block) and the reconfiguration interval is 32, because the vector size K of a column is 32, a column may take 8 (=256/32) cycles to complete processing a single thread block (e.g., 8 warps or NUM_EXEC being 8) and may be idle for the next 24 cycles until it receives the next configurations from the sequencer 106. The utilization factor of a column may only be 25%. In order to achieve improved utilization (e.g., 100%), additional configurations (e.g., 3 more sets of configurations) may need to be transferred to a column at the same time so that the column may continue execution after finishing one set of configurations.

Figure 8B:
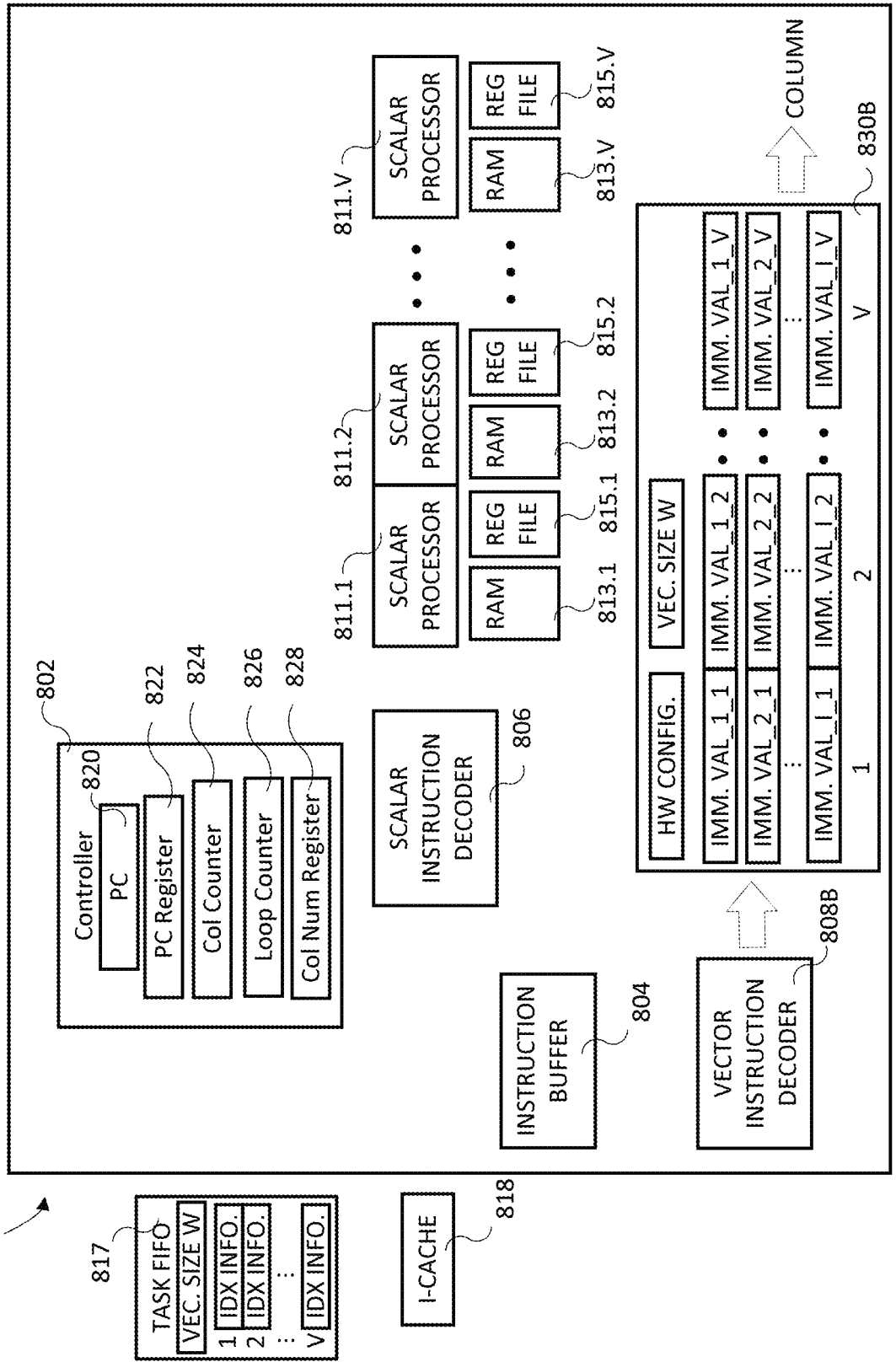
FIG. 8B schematically shows a sequencer for a processor in accordance with another embodiment of the present disclosure.

FIG. 8B schematically shows a sequencer 800B for a processor in accordance with another embodiment of the present disclosure. The sequencer 800B may be another embodiment of the sequencer 106 of FIG. 1, and may decode kernel programs, execute decoded scalar instructions, package decoded vector instructions into configurations and deliver the configurations to columns. Compared to the sequencer 800A, the sequencer 800B may comprise a plurality of scalar processors 811.1-811.V (instead of one scalar processor 810), a plurality of local memories 813.1-813.V (instead of one local memory 812), a plurality of scalar register files 815.1-815.V (instead of one scalar register file 814), a task buffer 817 (instead of the task buffer 816) and a vector instruction decoder 808B. The task buffer 817 may be loaded with a vector size W which specifies the number of thread blocks for a kernel program and may comprise a plurality of spaces for thread block index information. In comparison, the task buffer 816 may comprise one thread block index information. Other components of the sequencer 800B may be the same as the sequencer 800A (or adapted for vectorized execution of a scalar instruction).

The plurality of scalar processors 811.1-811.V, plurality of local memories 813.1-813.V and plurality of scalar register files 815.1-815.V may be referred to as the vectorized scalar processor, the vectorized local memory, and the vectorized scalar register file in a vectorized sequencer 106. The vector size V in the sequencer 800B may be referred to as the sequencer vector size (in contrast to the vector size K for the vector processing units of the PE array 114) and an exemplary sequencer vector size may be four (4) (e.g., V being 4).

External devices may initiate a kernel program to process W thread blocks in sequence by writing the vector size W and thread block index information of each of W thread blocks to the task buffer 817. The vector size W may be a number equal to or less than the sequencer vector size V. The sequencer 800B may load the vector size W and the thread block index information of W thread blocks from the task buffer 817 and store them to the vectorized scalar register file. The kernel program may include scalar instructions and vector instructions. If multiple sets of configurations are generated for each of the thread blocks from the same vector instructions, each set of configurations may be identical except parameters generated by scalar instructions and embedded as immediate values. Instead of generating configurations for each of W thread blocks, the sequencer 800B may generate one set of configurations by decoding vector instructions once and embed vectors of W parameters of W thread blocks as vectors of W immediate values. The vectorized scalar processor (e.g., the plurality of scalar processors 811.1-811.V) may concurrently execute scalar instructions and generate vectors of W parameters. The total number of vectors of W parameters that the vectorized scalar processor may generate for a column is up to I. A column may receive configurations that may contain up to I vectors of W immediate values. The total number of vectors of W parameters that the vectorized scalar processor may generate for a column is up to I. A column may receive configurations that may contain up to I vectors of W immediate values and repeatedly perform the same vector operation W times for each of W thread blocks using corresponding elements of vectors of W immediate values. Parts of a configuration that need to be changed for each repetition are the elements of vectors of W immediate values.

With the sequencer 800B, the vectorized scalar processor may execute the same scalar instructions for each of the thread blocks at once in parallel without decoding the same kernel multiple times. The differences in the configurations created from the same kernel program for different thread blocks are immediate values, which are generated by the same scalar instructions running on parameters with different values stored in the task buffer 817 and respective RAM 813.1-813.V. Therefore, the vectorized scalar processor may execute scalar instructions in a kernel program and generate up to I vectors of W parameters for W thread blocks for one column. In one embodiment, up to I vectors to W parameters may be embedded in configurations for one column as up to I vectors of W immediate values by the vector instruction decoder 808B. That is, one set of configurations for one column may have up to I vectors of W immediate values. The vector instruction decoder 808B may be adapted to embed up to I vectors of W immediate values to configurations, and in other aspects may be similar or identical to the vector instruction decoder 808A.

FIG. 8B shows a configuration 830B for one vector processing unit as an example of configuration generated by the vector instruction decoder 808B and delivered to one of the columns. The configuration 830B may include a field for hardware configuration, a field for a vector size (e.g., W) and a field for I vectors of V immediate values. For example, if the vector size W is set to 3, the vector processing units of the target column are configured by the hardware configuration then repeatedly perform the vector operations specified in the hardware configuration 3 times using IMM. VAL_1_1 to IMM. VAL_I_1 for the first round, IMM. VAL_1_2 to IMM. VAL_I_2 for the second round, and IMM. VAL_1_3 to IMM. VAL_I_3 for the third round. The field of hardware configuration may include one or more instructions to be performed at the vector processing units and the immediate values may include parameters for the one or more instructions to be performed. The vector size W may be a number equal to or less than the sequencer vector size V. In one embodiment, when W is less than V, only W elements of vectors may be filled, and the rest may be filled by zero. For example, if a kernel program processes 6 thread blocks and V is 4, the kernel program may be initiated twice with a vector size 3 (e.g., W being 3).

In embodiments of the processor 100 having the vectorized sequencer 800B, because a configuration may include the vector size W, PE, SB and MP may comprise thread block counters 216, 528, and 742, respectively, which may count for the vector size W. Counters 206 in PE, 520 in SB and 740 in MP may be warp counters for counting NUM_EXEC. PE, SB and MP may be adapted to retrieve the vector size W from the configuration and independently repeat the execution for each element of vectors of immediate values without reconfiguring the hardware component when all warp counters in each of PE, SB and MP count NUM_EXEC warps. A new configuration may be applied at PE, SB and MP after W rounds of repetitions have been counted by the thread block counters.

In one embodiment, with V being 4, in the sequencer 800B, once a scalar instruction is decoded, 4 ALUs of the vectorized scalar processor may concurrently execute the decoded scalar instruction using 4 sets of different parameters stored in 4 different local memories 813.1-813.V (e.g., 4 RAMs) and/or 4 different scalar register files 815.1-81.5.V (e.g., R0_0 in 815.1, R0_1 in 815.2, R0_2 in 815.3, and R0_3 in 815.4 if R0 is used in the instruction), then store the results in 4 scalar register files 815.1-81.5.V. It should be noted each of scalar register files 815.1-815.V may contain a set of scalar registers R0 to R31. For example, a load instruction "LOAD [100], R0" may access 4 RAMs at the same address 100, and store 4 units of data from 4 RAMs to registers R0_0, R0_1, R0_2, and R0_3; and after the load instruction, a vector instruction "LOAD [DVA+R0], MA" may refer R0 and the vector instruction decoder 808B may pick up 4 values from the 4 scalar register files and put them in the configuration as a vector of 4 immediate values. The vector processing units may be statically configured by the configurations except the immediate values. A vector processing unit may sequentially process 4 thread blocks using different immediate values for each block. Now a column may consume 4 times more cycles for one configuration and the utilization factor of the column may be improved.

In some embodiments, the number of active elements of the sequencer vector may be set in the task buffer 817 of the sequencer 800B as a vector size W along with thread block index information. The sequencer 800B may read the vector size W and thread block index information of each of W thread blocks from the task buffer 817 and store the thread block index information to scalar register files 815.1-81.5.W when a kernel program is initiated. A vector may be formed with each active element of the sequencer vector corresponding to a parameter for each thread block sequentially processed in the same column. Each of the vector elements may reside in either one of corresponding RAMs 813.1-813.W or scalar register files 815.1-81.5.W. For a register that is used to control the program flow such as a conditional jump, only one vector element may be needed, for example, the vector element 0 may be referred in the conditional jump.

It should be noted that the vectorized sequencer 800B may work for any thread block size when the same kernel program processes multiple thread blocks. The advantage is that even if the reconfiguration interval is shorter than vector operation execution time of one thread block, configuration switching overhead may be reduced from W to 1.

In some embodiments, the processor 100 may provide a multiply and accumulate (MAC) operation for 16 of 8-bit integer data (16-MAC operation) or 8 of 16-bit floating point data (8-MAC operation) to support convolution operations required in such applications as convolutional neural network and image processing. The 16-MAC operation may be expressed as $\alpha = \alpha + \Sigma_{i=0}^{15} w(i)*d(i)$. Here, 8-bit integers w and d are weights and data, respectively. A 32-bit integer a is the accumulation result. The multiply and add operation $\Sigma_{i=0}^{15} w(i)*d(i)$ may be performed in a memory port 120. The accumulation may be performed in a processing element 118 of the same column as the MP performing the multiply and add operation. The pseudo assembly code for the 16-MAC operation may be

LOADVEC % WEIGHT
LOADLANE.INT, % DATA, MAB
ADD MAB, IAB, IAB

The LOADVEC instruction may load 16 weights of 8-bit integer from the memory address WEIGHT to special registers in the memory port 120. The LOADLANE.INT instruction may load 16 data of 8-bit integer per thread from the memory address DATA, perform 16 multiplications and 15 additions, then assign the result to the 32-bit vector register MAB. The ADD instruction may be performed in the processing element 118 to accumulate the MAC result to the 32-bit vector register IAB.

In many cases, the contents of the special registers in the memory port 120 may be common among the thread blocks repeated in a column. To avoid loading the same parameters or executing the LOADVEC instruction multiple times, one bit may be reserved in the configuration 830B to direct a column to load such parameters only once for the first execution. For example, external devices may set this bit in the task buffer 817 and the sequencer 800B may pass this bit to the column.

Figure 9:
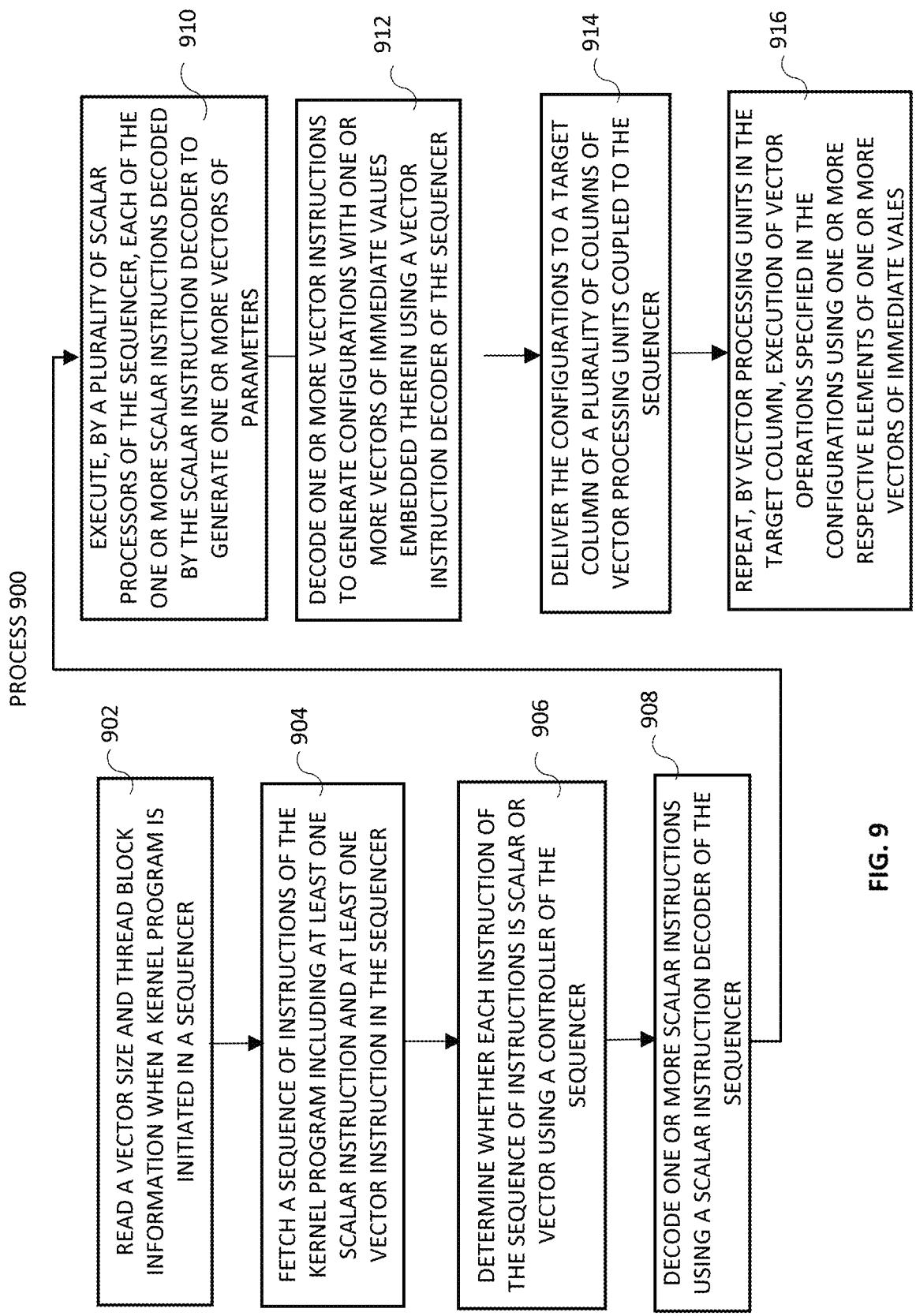
FIG. 9 is a flowchart of a method for executing a multi-threaded kernel in accordance with an embodiment of the present disclosure.

FIG. 9 is a flowchart of a process 900 for executing a kernel program including a plurality of thread blocks in accordance with an embodiment of the present disclosure. At block 902, a vector size representing a number of thread blocks for a kernel program to be processed in sequence and thread block index information of each of the thread blocks may be read when the kernel program is initiated in a sequencer. For example, when a kernel program is initiated to process multiple thread blocks in the sequencer 800B, the vector size W representing the number of thread blocks for the kernel program to be processed in sequence and the thread block index information of each of W thread blocks may be read (e.g., from the task buffer 817).

At block 904, a sequence of instructions of the kernel program including at least one scalar instruction and at least one vector instruction may be fetched in the sequencer. For example, the sequencer 106 of FIG. 1 may be an embodiment of the sequencer 800B and configured to fetch a sequence of mixed scalar and vector instructions for a multi-threaded kernel program. At block 906, whether each instruction is scalar or vector may be determined using a controller of the sequencer. For example, the controller 802 may be configured to determine whether an instruction is a scalar or a vector instruction (e.g., by examining certain bits of each instruction).

At block 908, one or more scalar instructions may be decoded using a scalar instruction decoder of the sequencer. For example, the scalar instruction decoder 806 may be configured to decode scalar instructions. At block 910, a plurality of scalar processors of the sequencer may be used to concurrently execute the one or more scalar instructions decoded by the scalar instruction decoder to generate one or more vectors of parameters. Each element of the vector of parameters may be a parameter of each of the thread blocks for the kernel program. For example, one or more scalar instructions may prepare one or more parameters for one thread block, the plurality of scalar processors 811.1-811.V may be configured to execute each of the decoded one or more scalar instructions concurrently to generate one or more vectors of parameters. Each element of the vector of parameters may be associated with thread block index information of each thread block of the number of thread blocks to be processed in sequence.

At block 912, one or more vector instructions may be decoded, using a vector instruction decoder of the sequencer, to generate a set of configurations with one or more vectors of parameters embedded therein as one or more vectors of immediate values. For example, the vector instruction decoder 808B may be configured to decode vector instructions to generate configurations for vector processing units. In one embodiment, a set of configurations may contain one or more vectors of immediate values.

At block 914, the set of configuration may be delivered to a target column of a plurality of columns of vector processing units coupled to the sequencer. In some embodiments, each column of the plurality of columns of vector processing units may include a memory port (MP), a switch box (SB) and a processing element (PE). Each PE may include a plurality of Arithmetic Logic Units (ALUs) (e.g., a vector ALU). For example, the set of configurations generated by the vector instruction decoder 808B may include 3 configurations for the MP 700, SB 300 and PE 200 of the target column.

At block 916, the vector processing units of the target column of the plurality of columns of vector processing units may repeatedly execute vector operations specified in the configurations using one or more respective elements of one or more vectors of immediate values per repetition. For example, each of PE, SB, and MP of the target column may repeatedly execute its respective vector operation W times using one or more respective elements of one or more vectors of W immediate values embedded in its own configuration.

The present disclosure provides apparatus, systems and methods for reconfigurable parallel processor (RPP). For example, an embodiment of a RPP may utilize a processing element (PE) array as a physical data path to process massive parallel data. The physical data path may be made identical in each section (e.g., one column of a MP, a SB and a PE), which may allow the dependency graph of a kernel program to be mapped to a virtual data path that may be an infinite repetition of the physical data path. Moreover, the scalar instructions of the kernel program may be executed by the sequencer without generating any configurations for a vector processing unit to execute the scalar instructions. Furthermore, scalar control flow instructions may also be executed by the sequencer instead of wasting any vector processing unit cycles.

An embodiment of a RPP may also utilize a gasket memory to temporally store outputs of the physical data path (e.g., processing element (PE) array) which is configured by one segment of the virtual data path which consists of N vector execution nodes. The gasket memory may function as a data buffer (e.g., FIFO) which feeds data back into the physical data path when the physical data path is reconfigured by the next segment of the virtual data path.

An embodiment of a RPP may also have a memory unit with memory interfaces (MIs) connected to each column (e.g., a MP, a SB and a PE) of the physical data path. All data accessed throughout the virtual data path may be stored in the memory unit. For each segment of the virtual data path, a MP may be reconfigured to access the memory unit differently while the data could stay the same.

Embodiments of a RPP may be optimized to allow massive parallelism for Single Instruction Multiple Threads (SIMT) processing. In one example, with one row of 32 PEs and each PE having 32 Arithmetic Logic Units (ALUs), 1024 ALUs may be included in one RPP core. In some embodiments, a multi-core processor may comprise multiple RPPs.

Embodiments of a RPP may be reconfigured according to a reconfiguration mechanism. The various components of a RPP that include one or more reconfiguration counters may be referred to as reconfigurable units. For example, each of the PEs (e.g., PE 118), the switch boxes (e.g., SB 122) and the memory ports (e.g., MP 120), may comprise one or more reconfiguration counters, such as the counter 206 in a PE, the counters 520 in a SB, the counters 740 in a MP. Data processing may be pipelined when there may be no dependency between threads. Identical instructions may be executed multiple times until all threads (e.g., 32 warps of threads for one reconfigurable unit if the total number of threads is 1024) are processed. In embodiments that the sequencer 106 is not vectorized, when counters in a reconfigurable unit reach a programmed number (e.g., NUM_EXEC), the reconfigurable unit may replace its configuration to a new context. This reconfiguration may be done in the same way in each PE, SB and MP. Self-reconfiguration may be achieved with minimum idle time for switching.

In the embodiments that the sequencer 106 is vectorized, each of the vector processing units (e.g., PE, SB and MP) may comprise 2 types of counters, one or more warp counters and a thread block counter. The warp counter may count the number of incoming and outgoing data at input and output ports, respectively. The thread block counter may count the number of thread blocks processed by the vector processing unit. When all warp counters in the vector processing unit finish counting NUM_EXEC, the warp counters may be reset and the thread block counter may be incremented by one, then the warp counters may count another round until all warp counters finish counting NUM_EXEC again and the thread block counter may count another thread block. This may continue until all thread blocks (e.g., W) in a configuration are processed and the vector processing unit may apply a next configuration.

The exemplary reconfiguration mechanism may reduce the power spent on configuration because the configuration is only switched once after all threads have been processed. This may also reduce idle time between configurations by switching each reconfigurable unit independently at its earliest time.

In some embodiments, all warps may load the same data using the same addresses in the shared memory access mode. Due to the pipelined nature of operation, only the data load instruction for the first warp may need to be performed. The data loaded may be shared with other warps to reduce the memory access traffic and power consumption.

In an exemplary embodiment, a processor may comprise a sequencer and a plurality of columns of vector processing units coupled to the sequencer. The sequencer may include: a scalar instruction decoder, a vector instruction decoder, and a plurality of scalar processors configured to concurrently execute each of one or more scalar instructions decoded by the scalar instruction decoder to generate one or more vectors of parameters. The vector instruction decoder may be configured to decode one or more vector instructions to generate a set of configurations with the one or more vectors of parameters embedded therein as one or more vectors of immediate values and send the set of configurations to a target column of the plurality of columns of vector processing units, and vector processing units in the target column may be configured to repeat vector operations specified in the set of configurations using one or more respective elements of one or more vectors of immediate values per repetition.

In one embodiment, the set of configurations may be broadcasted to the plurality of columns of vector processing units and the sequencer may be configured to assert a valid bit for the target column to receive the set of configurations.

In one embodiment, the sequencer may further include a plurality of local memories and a plurality of scalar register files. Each of the plurality of scalar register files may be shared by one of the plurality of scalar processors and the vector instruction decoder. The plurality of scalar processors may be configured to execute the one or more scalar instructions to read one or more vectors of input parameters from the plurality of local memories and/or the plurality of scalar register files and to write one or more vectors of parameters to the plurality of scalar register files to pass the one or more vectors of parameters to the vector instruction decoder.

In one embodiment, each element of each vector of the one or more vectors of input parameters and each element of each vector of the one or more vectors of immediate values in the set of configurations may be associated with thread block index information of respective thread blocks for a kernel program.

In one embodiment, the set of configurations may include a vector size W indicating a number of elements in each vector of the one or more vectors of immediate values.

In one embodiment, the set of configurations may include a number NUM_EXEC indicating a number of warps of threads in a thread block to be processed. Each vector processing unit of the plurality of columns of vector processing units may include counters for counting a number of times data passing through at input and output ports of the vector processing unit for the number NUM_EXEC and for counting a number of processed vector elements of the one or more vectors of immediate values for the vector size W.

In one embodiment, the sequencer may be further configured to execute scalar control flow instructions including repeat, jump, poll, and barrier. For a register that is used in a control flow instruction, only one scalar register file of one of the plurality of scalar processors may be referred.

In one embodiment, the set of configurations may include a bit to indicate to the target column whether to load certain parameters from the memory only once for a first execution of the kernel program which is executed W times in sequence by the target column. W may be a vector size of the one or more vectors of immediate values.

In another embodiment, a processor, comprising: a sequencer and a plurality of columns of vector processing units coupled to the sequencer. The sequencer may be configured to: decode one or more scalar instructions, execute the one or more scalar instructions to generate one or more vectors of parameters, and decode one or more vector instructions to generate a set of configurations with the one or more vectors of parameters embedded therein as one or more vectors of immediate values. The sequencer may be configured to send the set of configurations to a target column of the plurality of columns of vector processing units, and vector processing units in the target column may be configured to repeat vector operations specified in the set of configurations using one or more respective elements of the one or more vectors of immediate values per repetition.

In one embodiment, the set of configurations may be broadcasted to the plurality of columns of vector processing units and the sequencer may be configured to assert a valid bit for the target column to receive the set of configurations.

In one embodiment, the sequencer may include a scalar instruction decoder, a plurality of scalar processors, a vector instruction decoder, and a plurality of scalar register files. Each of the plurality of scalar register files may be shared by one of the plurality of scalar processors and the vector instruction decoder, and the plurality of scalar processors may be configured to execute the one or more scalar instructions decoded by the scalar instruction decoder in parallel to write the one or more vectors of parameters to the plurality of scalar register files to pass the one or more vectors of parameters to the vector instruction decoder.

In one embodiment, the sequencer may further include a plurality of local memories. The plurality of scalar processors may be configured to execute the one or more scalar instructions to read one or more vectors of input parameters from the plurality of local memories and/or the plurality of scalar register files. Each element of each vector of the one or more vectors of input parameters and each element of each vector of the one or more vectors of immediate values in the set of configurations may be associated with thread block index information of respective thread blocks for a kernel program.

In one embodiment, the set of configurations may include a vector size W indicating a number of elements in each vector of the one or more vectors of immediate values.

In one embodiment, the set of configurations may include a number NUM_EXEC indicating a number of warps of threads in a thread block to be processed, wherein each vector processing unit of the plurality of columns of vector processing units includes counters for counting a number of times data passing through at input and output ports of the vector processing unit for the number NUM_EXEC and for counting a number of processed vector elements of the one or more vectors of immediate values for the vector size W.

In one embodiment, the sequencer may be further configured to execute scalar control flow instructions including repeat, jump, poll, and barrier. For a register that is used in a control flow instruction, only one scalar register file of one of the plurality of scalar processors may be referred.

In one embodiment, the set of configurations may include a bit to indicate to the target column whether to load certain parameters from the memory only once for a first execution of a kernel program which is executed W times in sequence by the target column.

In yet another exemplary embodiment, a method may comprise reading a vector size representing a number of thread blocks that a kernel program processes in sequence and thread block index information of each of the thread blocks when the kernel program is initiated in a sequencer; fetching a sequence of instructions of the kernel program including one or more scalar instructions and one or more vector instructions in the sequencer; determining whether each instruction of the sequence of instructions is scalar or vector using a controller of the sequencer; decoding one or more scalar instructions using a scalar instruction decoder of the sequencer; executing, concurrently using a plurality of scalar processors of the sequencer, each of the one or more scalar instructions decoded by the scalar instruction decoder to generate one or more vectors of parameters, each element of each vector of one or more vectors of parameters is for a respective thread block of the thread blocks for the kernel program; decoding, using a vector instruction decoder of the sequencer, one or more vector instructions to generate a set of configurations with the one or more vectors of parameters embedded therein as one or more vectors of immediate values; delivering the set of configurations to a target column of a plurality of columns of vector processing units coupled to the sequencer; and repeatedly execute, at vector processing units of the target column, vector operations specified in the set of configurations using one or more respective elements of the one or more vectors of immediate values per repetition.

In one embodiment, executing the one or more scalar instructions decoded by the scalar instruction decoder may comprise reading one or more vectors of input parameters from a plurality of local memories and/or a plurality of scalar register files, and writing the one or more vectors of parameters to the plurality of scalar register files. Each scalar register file of the plurality of scalar register files may be shared by one scalar processor of the plurality of scalar processors and the vector instruction decoder.

In one embodiment, each element of each vector of the one or more vectors of input parameters and each element of each vector of the one or more vectors of immediate values in the set of configurations may be associated with thread block index information of a respective thread block of the thread blocks for the kernel program.

In one embodiment, the method may further comprise, at each vector processing unit of the plurality of columns of vector processing units, counting a number of times data passing through at input and output ports using warp counters and counting a number of processed vector elements of the one or more vectors of immediate values using a thread block counter.

The techniques described herein may be implemented in one or more application specific integrated circuits (ASICs) in digital logic gates, or by a processor that executes instructions stored in a tangible processor readable memory storage media.

In one embodiment, any of the disclosed methods and operations may be implemented in software comprising computer-executable instructions stored on one or more computer-readable storage media. The one or more computer-readable storage media may include non-transitory computer-readable media (such as removable or non-removable magnetic disks, magnetic tapes or cassettes, solid state drives (SSDs), hybrid hard drives, CD-ROMs, CD-RWs, DVDs, or any other tangible storage medium), volatile memory components (such as DRAM or SRAM), or non-volatile memory components (such as hard drives)). The computer-executable instructions may be executed on a processor (e.g., a microcontroller, a microprocessor, a digital signal processor, etc.). Moreover, an embodiment of the present disclosure may be used as a general-purpose processor, a graphics processor, a microcontroller, a microprocessor, or a digital signal processor.

It should be noted that as used herein, a "coupling" and a "connection" between two components, such as one component being "coupled" or "connected" to another component may refer to an electronic connection between two components, which may include but not limited to, by electronic wiring, through an electronic element (e.g., a resistor, a transistor), etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A processor, comprising:
 a sequencer, including:
  a scalar instruction decoder,
  a vector instruction decoder, and
  a plurality of scalar processors configured to concurrently execute each of one or more scalar instructions decoded by the scalar instruction decoder to generate one or more vectors of parameters; and
 a plurality of columns of vector processing units coupled to the sequencer, wherein the vector instruction decoder is configured to decode one or more vector instructions to generate a set of configurations with the one or more vectors of parameters embedded therein as one or more vectors of immediate values and send the set of configurations to a target column of the plurality of columns of vector processing units, and vector processing units in the target column are configured to repeat vector operations specified in the set of configurations using one or more respective elements of one or more vectors of immediate values per repetition;

wherein the sequencer further includes a plurality of local memories and a plurality of scalar register files, each of the plurality of scalar register files is shared by one of the plurality of scalar processors and the vector instruction decoder, and wherein the plurality of scalar processors are configured to execute the one or more scalar instructions to read one or more vectors of input parameters from the plurality of local memories and/or the plurality of scalar register files and to write one or more vectors of parameters to the plurality of scalar register files to pass the one or more vectors of parameters to the vector instruction decoder;

wherein each element of each vector of the one or more vectors of input parameters and each element of each vector of the one or more vectors of immediate values in the set of configurations are associated with thread block index information of respective thread blocks for a kernel program.

2. The processor of claim 1, wherein the set of configurations are broadcasted to the plurality of columns of vector processing units and the sequencer is configured to assert a valid bit for the target column to receive the set of configurations.

3. The processor of claim 1, wherein the set of configurations includes a vector size W indicating a number of elements in each vector of the one or more vectors of immediate values.

4. The processor of claim 3, wherein the set of configurations includes a number NUM_EXEC indicating a number of warps of threads in a thread block to be processed, wherein each vector processing unit of the plurality of columns of vector processing units includes counters for counting a number of times data passing through at input and output ports of the vector processing unit for the number NUM_EXEC and for counting a number of processed vector elements of the one or more vectors of immediate values for the vector size W.

5. The processor of claim 1, wherein the sequencer is further configured to execute scalar control flow instructions including repeat, jump, poll, and barrier, wherein for a register that is used in a control flow instruction, only one scalar register file of one of the plurality of scalar processors is referred.

6. The processor of claim 1, wherein the set of configurations includes a bit to indicate to the target column whether to load certain parameters from the memory only once for a first execution of the kernel program which is executed W times in sequence by the target column, wherein W is a vector size of the one or more vectors of immediate values.

7. A processor, comprising:
a sequencer configured to:
decode one or more scalar instructions,
execute the one or more scalar instructions to generate one or more vectors of parameters, and
decode one or more vector instructions to generate a set of configurations with the one or more vectors of parameters embedded therein as one or more vectors of immediate values; and
a plurality of columns of vector processing units coupled to the sequencer, wherein the sequencer is configured to send the set of configurations to a target column of the plurality of columns of vector processing units, and vector processing units in the target column are configured to repeat vector operations specified in the set of configurations using one or more respective elements of the one or more vectors of immediate values per repetition;

wherein the sequencer includes a scalar instruction decoder, a plurality of scalar processors, a vector instruction decoder, and a plurality of scalar register files, each of the plurality of scalar register files is shared by one of the plurality of scalar processors and the vector instruction decoder, and the plurality of scalar processors are configured to execute the one or more scalar instructions decoded by the scalar instruction decoder in parallel to write the one or more vectors of parameters to the plurality of scalar register files to pass the one or more vectors of parameters to the vector instruction decoder;

wherein the sequencer further includes a plurality of local memories, and the plurality of scalar processors are configured to execute the one or more scalar instructions to read one or more vectors of input parameters from the plurality of local memories and/or the plurality of scalar register files, and wherein each element of each vector of the one or more vectors of input parameters and each element of each vector of the one or more vectors of immediate values in the set of configurations are associated with thread block index information of respective thread blocks for a kernel program;

wherein the set of configurations includes a vector size W indicating a number of elements in each vector of the one or more vectors of immediate values.

8. The processor of claim 7, wherein the set of configurations are broadcasted to the plurality of columns of vector processing units and the sequencer is configured to assert a valid bit for the target column to receive the set of configurations.

9. The processor of claim 7, wherein the set of configurations includes a number NUM_EXEC indicating a number of warps of threads in a thread block to be processed, wherein each vector processing unit of the plurality of columns of vector processing units includes counters for counting a number of times data passing through at input and output ports of the vector processing unit for the number NUM_EXEC and for counting a number of processed vector elements of the one or more vectors of immediate values for the vector size W.

10. The processor of claim 7, wherein the sequencer is further configured to execute scalar control flow instructions including repeat, jump, poll, and barrier, wherein for a register that is used in a control flow instruction, only one scalar register file of one of the plurality of scalar processors is referred.

11. The processor of claim 7, wherein the set of configurations includes a bit to indicate to the target column whether to load certain parameters from the memory only once for a first execution of a kernel program which is executed W times in sequence by the target column.

12. A method, comprising:
reading a vector size representing a number of thread blocks that a kernel program processes in sequence and thread block index information of each of the thread blocks when the kernel program is initiated in a sequencer;
fetching a sequence of instructions of the kernel program including one or more scalar instructions and one or more vector instructions in the sequencer;

determining whether each instruction of the sequence of instructions is scalar or vector using a controller of the sequencer;

decoding one or more scalar instructions using a scalar instruction decoder of the sequencer;

executing, concurrently using a plurality of scalar processors of the sequencer, each of the one or more scalar instructions decoded by the scalar instruction decoder to generate one or more vectors of parameters, each element of each vector of one or more vectors of parameters is for a respective thread block of the thread blocks for the kernel program;

decoding, using a vector instruction decoder of the sequencer, one or more vector instructions to generate a set of configurations with the one or more vectors of parameters embedded therein as one or more vectors of immediate values;

delivering the set of configurations to a target column of a plurality of columns of vector processing units coupled to the sequencer; and repeatedly executing, at vector processing units of the target column, vector operations specified in the set of configurations using one or more respective elements of the one or more vectors of immediate values per repetition;

wherein executing the one or more scalar instructions decoded by the scalar instruction decoder comprises reading one or more vectors of input parameters from a plurality of local memories and/or a plurality of scalar register files, and writing the one or more vectors of parameters to the plurality of scalar register files, each scalar register file of the plurality of scalar register files is shared by one scalar processor of the plurality of scalar processors and the vector instruction decoder;

wherein each element of each vector of the one or more vectors of input parameters and each element of each vector of the one or more vectors of immediate values in the set of configurations are associated with thread block index information of a respective thread block of the thread blocks for the kernel program.

13. The method of claim 12, further comprising, at each vector processing unit of the plurality of columns of vector processing units, counting a number of times data passing through at input and output ports using warp counters and counting a number of processed vector elements of the one or more vectors of immediate values using a thread block counter.

14. A processor, comprising:
a sequencer, including:
a scalar instruction decoder,
a vector instruction decoder, and
a plurality of scalar processors configured to concurrently execute each of one or more scalar instructions decoded by the scalar instruction decoder to generate one or more vectors of parameters; and
a plurality of columns of vector processing units coupled to the sequencer, wherein the vector instruction decoder is configured to decode one or more vector instructions to generate a set of configurations with the one or more vectors of parameters embedded therein as one or more vectors of immediate values and send the set of configurations to a target column of the plurality of columns of vector processing units, and vector processing units in the target column are configured to repeat vector operations specified in the set of configurations using one or more respective elements of one or more vectors of immediate values per repetition;
wherein the sequencer is further configured to execute scalar control flow instructions including repeat, jump, poll, and barrier, wherein for a register that is used in a control flow instruction, only one scalar register file of one of the plurality of scalar processors is referred.

15. The processor of claim 14, wherein the set of configurations are broadcasted to the plurality of columns of vector processing units and the sequencer is configured to assert a valid bit for the target column to receive the set of configurations.

16. A processor, comprising:
a sequencer, including:
a scalar instruction decoder,
a vector instruction decoder, and
a plurality of scalar processors configured to concurrently execute each of one or more scalar instructions decoded by the scalar instruction decoder to generate one or more vectors of parameters; and
a plurality of columns of vector processing units coupled to the sequencer, wherein the vector instruction decoder is configured to decode one or more vector instructions to generate a set of configurations with the one or more vectors of parameters embedded therein as one or more vectors of immediate values and send the set of configurations to a target column of the plurality of columns of vector processing units, and vector processing units in the target column are configured to repeat vector operations specified in the set of configurations using one or more respective elements of one or more vectors of immediate values per repetition;
wherein the set of configurations includes a bit to indicate to the target column whether to load certain parameters from the memory only once for a first execution of the kernel program which is executed W times in sequence by the target column, wherein W is a vector size of the one or more vectors of immediate values.

17. The processor of claim 16, wherein the set of configurations are broadcasted to the plurality of columns of vector processing units and the sequencer is configured to assert a valid bit for the target column to receive the set of configurations.

18. A processor, comprising:
a sequencer configured to:
decode one or more scalar instructions,
execute the one or more scalar instructions to generate one or more vectors of parameters, and
decode one or more vector instructions to generate a set of configurations with the one or more vectors of parameters embedded therein as one or more vectors of immediate values; and
a plurality of columns of vector processing units coupled to the sequencer, wherein the sequencer is configured to send the set of configurations to a target column of the plurality of columns of vector processing units, and vector processing units in the target column are configured to repeat vector operations specified in the set of configurations using one or more respective elements of the one or more vectors of immediate values per repetition;
wherein the sequencer is further configured to execute scalar control flow instructions including repeat, jump, poll, and barrier, wherein for a register that is used in a control flow instruction, only one scalar register file of one of the plurality of scalar processors is referred.

19. The processor of claim 18, wherein the set of configurations are broadcasted to the plurality of columns of vector processing units and the sequencer is configured to assert a valid bit for the target column to receive the set of configurations.

20. A processor, comprising:
a sequencer configured to:
decode one or more scalar instructions,
execute the one or more scalar instructions to generate one or more vectors of parameters, and
decode one or more vector instructions to generate a set of configurations with the one or more vectors of parameters embedded therein as one or more vectors of immediate values; and
a plurality of columns of vector processing units coupled to the sequencer, wherein the sequencer is configured to send the set of configurations to a target column of the plurality of columns of vector processing units, and vector processing units in the target column are configured to repeat vector operations specified in the set of configurations using one or more respective elements of the one or more vectors of immediate values per repetition;
wherein the set of configurations includes a bit to indicate to the target column whether to load certain parameters from the memory only once for a first execution of a kernel program which is executed W times in sequence by the target column.

21. The processor of claim 20, wherein the set of configurations are broadcasted to the plurality of columns of vector processing units and the sequencer is configured to assert a valid bit for the target column to receive the set of configurations.

22. A method, comprising:
reading a vector size representing a number of thread blocks that a kernel program processes in sequence and thread block index information of each of the thread blocks when the kernel program is initiated in a sequencer;
fetching a sequence of instructions of the kernel program including one or more scalar instructions and one or more vector instructions in the sequencer;
determining whether each instruction of the sequence of instructions is scalar or vector using a controller of the sequencer;
decoding one or more scalar instructions using a scalar instruction decoder of the sequencer;
executing, concurrently using a plurality of scalar processors of the sequencer, each of the one or more scalar instructions decoded by the scalar instruction decoder to generate one or more vectors of parameters, each element of each vector of one or more vectors of parameters is for a respective thread block of the thread blocks for the kernel program;
decoding, using a vector instruction decoder of the sequencer, one or more vector instructions to generate a set of configurations with the one or more vectors of parameters embedded therein as one or more vectors of immediate values;
delivering the set of configurations to a target column of a plurality of columns of vector processing units coupled to the sequencer; and
repeatedly executing, at vector processing units of the target column, vector operations specified in the set of configurations using one or more respective elements of the one or more vectors of immediate values per repetition;
at each vector processing unit of the plurality of columns of vector processing units, counting a number of times data passing through at input and output ports using warp counters and counting a number of processed vector elements of the one or more vectors of immediate values using a thread block counter.

* * * * *